United States Patent
Leifer et al.

(10) Patent No.: US 7,139,592 B2
(45) Date of Patent: Nov. 21, 2006

(54) NULL DEEPENING FOR AN ADAPTIVE ANTENNA BASED COMMUNICATION STATION

(75) Inventors: Mark C. Leifer, Fremont, CA (US); Tibor Boros, Sunnyvale, CA (US); Mitchell D. Trott, Mountain View, CA (US); Louis C. Yun, Santa Clara, CA (US)

(73) Assignee: ArrayComm LLC, San Jose, CA (US)

( * ) Notice: Subject to any disclaimer, the term of this patent is extended or adjusted under 35 U.S.C. 154(b) by 0 days.

(21) Appl. No.: 09/336,933

(22) Filed: Jun. 21, 1999

(65) Prior Publication Data

US 2002/0013164 A1    Jan. 31, 2002

(51) Int. Cl.
*H04M 1/00* (2006.01)
(52) U.S. Cl. .............. 455/562.1; 455/277.2; 455/278.1; 375/349
(58) Field of Classification Search ........... 455/228.1, 455/562, 550, 501, 506, 13.3, 62–63, 561, 455/509, 33.1, 53.1, 54.1, 67.1, 67.3, 67.4, 455/115, 423–425, 562.1, 277.2, 278.1, 279, 455/276.1, 277.1, 279.1, 295–296, 303–304; 342/171–172, 368–374, 169, 16–9; 370/342, 370/389, 310, 441, 210, 335, 250, 252, 479; 575/346–351

See application file for complete search history.

(56) References Cited

U.S. PATENT DOCUMENTS

| 3,704,465 A | 11/1972 | Masak et al. |
| 3,774,209 A | 11/1973 | Fleming et al. |
| 3,798,645 A | 3/1974 | Baurle et al. |
| 3,852,749 A | 12/1974 | Kohler |
| 3,946,385 A | 3/1976 | Ewen |
| 4,005,379 A | 1/1977 | Lerner |
| 4,035,746 A | 7/1977 | Covington, Jr. |
| 4,085,319 A | 4/1978 | Deitz et al. |
| 4,128,740 A | 12/1978 | Graziano |
| 4,263,568 A | 4/1981 | Nemit |
| 4,316,191 A | 2/1982 | Sawatari et al. |
| 4,375,622 A | 3/1983 | Hollingsworth et al. |

(Continued)

FOREIGN PATENT DOCUMENTS

EP    0 639 035 A1    2/1995

(Continued)

OTHER PUBLICATIONS

Acampora et al., "A New Adaptive MAC Layer Protocol for Wireless ATM Networks in Harsh Fading and Interference Environments", 1997 IEEE, pp. 410-415.

(Continued)

*Primary Examiner*—Pablo N. Tran
(74) *Attorney, Agent, or Firm*—Blakely, Sokoloff, Taylor & Zafman LLP

(57) ABSTRACT

A method and apparatus is described for modifying a smart antenna processing strategy determined from a set of signals received at an array of antenna elements of a wireless station, such as a set of weights for processing received antenna signals or forming a set of antenna signals for transmission. The method and apparatus uses the signatures of one or more interferers to produce a modified processing strategy that improves the nulling to the one or more interferers in that, when the modified strategy is applied on the downlink, the transmit signal strength in the direction of the one or more interferers is decreased, and, when the modified strategy is applied on the uplink, the sensitivity to signals from the direction of the one or more interferers is decreased.

70 Claims, 6 Drawing Sheets

U.S. PATENT DOCUMENTS

| | | |
|---|---|---|
| 4,434,505 A | 2/1984 | Gutleber |
| 4,475,010 A | 10/1984 | Huensch et al. |
| 4,626,859 A | 12/1986 | Stansfield |
| 4,639,732 A | 1/1987 | Acoraci et al. |
| 4,639,914 A | 1/1987 | Winters |
| 4,658,096 A | 4/1987 | West, Jr. et al. |
| 4,737,794 A | 4/1988 | Jones |
| 4,737,975 A | 4/1988 | Shafer |
| 4,742,356 A | 5/1988 | Kuipers |
| 4,750,147 A | 6/1988 | Roy, III et al. |
| 4,775,997 A | 10/1988 | West, Jr. et al. |
| 4,796,291 A | 1/1989 | Makino |
| 4,827,395 A | 5/1989 | Anders et al. |
| 4,829,554 A | 5/1989 | Barnes et al. |
| 4,837,800 A | 6/1989 | Freeburg et al. |
| 4,855,748 A | 8/1989 | Brandao et al. |
| 4,910,794 A | 3/1990 | Mahany |
| 4,922,517 A | 5/1990 | West, Jr. et al. |
| 4,926,186 A | 5/1990 | Kelly et al. |
| 4,940,963 A | 7/1990 | Gutman et al. |
| 4,947,452 A | 8/1990 | Hattori et al. |
| 4,955,082 A | 9/1990 | Hattori et al. |
| 4,965,732 A | 10/1990 | Roy, III et al. |
| 4,965,849 A | 10/1990 | Kunihiro |
| 4,965,850 A | 10/1990 | Schloemer |
| 4,972,151 A | 11/1990 | Rosen |
| 4,989,204 A | 1/1991 | Shimizu et al. |
| 5,041,833 A | 8/1991 | Weinberg |
| 5,052,799 A | 10/1991 | Sasser et al. |
| 5,093,924 A | 3/1992 | Toshiyuki et al. |
| 5,103,459 A | 4/1992 | Gilhousen et al. |
| 5,109,535 A | 4/1992 | Kume et al. |
| 5,124,697 A | 6/1992 | Moore |
| 5,142,253 A | 8/1992 | Mallavarpu et al. |
| 5,159,593 A | 10/1992 | D'Amico et al. |
| 5,255,210 A | 10/1993 | Gardner et al. |
| 5,260,968 A | 11/1993 | Gardner et al. |
| 5,262,789 A | 11/1993 | Silverstein |
| 5,274,844 A | 12/1993 | Harrison et al. |
| 5,276,907 A | 1/1994 | Meidan |
| 5,283,540 A | 2/1994 | Myer |
| 5,299,148 A | 3/1994 | Gardner et al. |
| 5,335,249 A | 8/1994 | Krueger et al. |
| 5,345,596 A | 9/1994 | Buchenhorner et al. |
| 5,361,303 A | 11/1994 | Eatwell |
| 5,367,559 A | 11/1994 | Kay et al. |
| 5,379,320 A | 1/1995 | Fernandes et al. |
| 5,387,915 A | 2/1995 | Moussa et al. |
| 5,423,072 A | 6/1995 | Iwashita et al. |
| 5,430,760 A | 7/1995 | Dent |
| 5,440,281 A | 8/1995 | Wey et al. |
| 5,448,621 A | 9/1995 | Knudsen |
| 5,457,812 A | 10/1995 | Siira et al. |
| 5,465,399 A | 11/1995 | Oberholtzer et al. |
| 5,471,647 A | 11/1995 | Gerlach et al. |
| 5,475,864 A | 12/1995 | Hamabe |
| 5,475,868 A | 12/1995 | Duque-Anton et al. |
| 5,497,505 A | 3/1996 | Koohgoli et al. |
| 5,515,378 A | 5/1996 | Roy, III et al. |
| 5,530,449 A | 6/1996 | Wachs et al. |
| 5,530,917 A | 6/1996 | Andersson et al. |
| 5,532,706 A | 7/1996 | Reinhardt et al. |
| 5,537,438 A | 7/1996 | Mourot et al. |
| 5,543,801 A | 8/1996 | Shawyer |
| 5,546,090 A | 8/1996 | Roy, III et al. |
| 5,548,813 A | 8/1996 | Charas et al. |
| 5,553,074 A | 9/1996 | Acampora |
| 5,555,445 A | 9/1996 | Booth |
| 5,557,657 A | 9/1996 | Barnett |
| 5,565,873 A * | 10/1996 | Dean ..................... 342/372 |
| 5,566,209 A | 10/1996 | Forssen et al. |
| 5,574,977 A | 11/1996 | Joseph |
| 5,576,717 A | 11/1996 | Searle et al. |
| 5,592,490 A * | 1/1997 | Barratt et al. ............... 370/310 |
| 5,596,625 A | 1/1997 | LeBlanc |
| 5,603,082 A | 2/1997 | Hamabe |
| 5,603,089 A | 2/1997 | Searle et al. |
| 5,606,729 A | 2/1997 | D'Amico et al. |
| 5,615,409 A | 3/1997 | Forssen et al. |
| 5,619,503 A | 4/1997 | Dent |
| 5,621,752 A | 4/1997 | Antonio et al. |
| 5,625,880 A | 4/1997 | Goldburg |
| 5,625,885 A | 4/1997 | Nakazawa et al. |
| 5,638,375 A | 6/1997 | Dettro et al. |
| 5,642,353 A | 6/1997 | Roy, III |
| 5,649,287 A | 7/1997 | Forssen et al. |
| 5,673,291 A | 9/1997 | Dent |
| 5,675,581 A * | 10/1997 | Soliman .................... 370/252 |
| 5,678,188 A | 10/1997 | Hisamura |
| 5,684,794 A | 11/1997 | Rosenblum et al. |
| 5,684,836 A | 11/1997 | Nagayasu et al. |
| 5,689,219 A | 11/1997 | Piirainen |
| 5,689,502 A | 11/1997 | Scott |
| 5,694,416 A | 12/1997 | Johnson |
| 5,697,066 A | 12/1997 | Acampora |
| 5,708,971 A | 1/1998 | Dent |
| 5,726,978 A | 3/1998 | Frodigh et al. |
| 5,732,076 A | 3/1998 | Ketseoglou et al. |
| 5,742,904 A | 4/1998 | Pinder et al. |
| 5,745,858 A | 4/1998 | Sato et al. |
| 5,748,676 A | 5/1998 | Mahany |
| 5,752,165 A | 5/1998 | Hokkanen |
| 5,774,461 A | 6/1998 | Hyden et al. |
| 5,809,009 A | 9/1998 | Matsuoka et al. |
| 5,809,019 A | 9/1998 | Ichihara et al. |
| 5,812,090 A | 9/1998 | Chevalier et al. |
| 5,818,918 A | 10/1998 | Fujii |
| 5,819,182 A | 10/1998 | Gardner et al. |
| 5,825,762 A | 10/1998 | Kamin, Jr. et al. |
| 5,828,658 A | 10/1998 | Ottersten et al. |
| 5,845,212 A | 12/1998 | Tanaka |
| 5,867,123 A | 2/1999 | Geyh et al. |
| 5,870,393 A | 2/1999 | Yano et al. |
| 5,884,148 A | 3/1999 | Bilgic et al. |
| 5,884,178 A | 3/1999 | Ericsson et al. |
| 5,887,038 A | 3/1999 | Golden |
| 5,905,721 A * | 5/1999 | Liu et al. ..................... 370/342 |
| 5,909,470 A | 6/1999 | Barratt et al. |
| 5,914,946 A | 6/1999 | Avidor et al. |
| 5,930,243 A | 7/1999 | Parish et al. |
| 5,933,421 A | 8/1999 | Alamouti et al. |
| 5,955,992 A * | 9/1999 | Shattil ....................... 342/375 |
| 5,970,394 A | 10/1999 | Arpee et al. |
| 5,973,638 A * | 10/1999 | Robbins et al. ............. 342/172 |
| 5,999,826 A | 12/1999 | Whinnett |
| 6,005,854 A * | 12/1999 | Xu et al. ..................... 370/335 |
| 6,009,124 A * | 12/1999 | Smith et al. ................ 375/267 |
| 6,018,317 A | 1/2000 | Dogan et al. |
| 6,018,555 A | 1/2000 | Mahany |
| 6,018,643 A | 1/2000 | Golemon et al. |
| 6,023,203 A * | 2/2000 | Parish ....................... 333/126 |
| 6,037,898 A | 3/2000 | Parish et al. |
| 6,061,553 A | 5/2000 | Matsuoka et al. |
| 6,064,865 A | 5/2000 | Kuo et al. |
| 6,067,324 A | 5/2000 | Harrison |
| 6,108,565 A * | 8/2000 | Scherzer ..................... 455/562 |
| 6,122,260 A | 9/2000 | Liu et al. |
| 6,131,016 A | 10/2000 | Greenstein et al. |
| 6,141,567 A * | 10/2000 | Youssefmir et al. ......... 455/562 |
| 6,154,661 A | 11/2000 | Goldburg |
| 6,185,412 B1 | 2/2001 | Pentikainen et al. |
| 6,219,561 B1 | 4/2001 | Raleigh |
| 6,236,839 B1* | 5/2001 | Gu et al. ................... 455/67.4 |
| 6,292,664 B1 | 9/2001 | Ostrup |

| | | | |
|---|---|---|---|
| 6,337,985 B1 | 1/2002 | Roux | |
| 6,385,181 B1 * | 5/2002 | Tsutsui et al. | 370/335 |
| 6,426,973 B1 * | 7/2002 | Madhow et al. | 375/231 |
| 6,690,747 B1 * | 2/2004 | Petrus et al. | 375/324 |

FOREIGN PATENT DOCUMENTS

| | | |
|---|---|---|
| EP | 0 665 665 A1 | 8/1995 |
| EP | 0 713 261 A1 | 5/1996 |
| EP | 0 777 400 A2 | 6/1997 |
| EP | 0 786 914 A2 | 7/1997 |
| EP | 0786914 A2 | 7/1997 |
| EP | 0 841 827 A2 | 5/1998 |
| GB | 2 237 706 A | 5/1991 |
| GB | 2 295 524 A | 5/1996 |
| GB | 2 313 261 A | 11/1997 |
| JP | 7-170548 | 4/1995 |
| WO | 95/34103 | 12/1995 |
| WO | WO 96/22642 | 7/1996 |
| WO | WO 96/22647 | 7/1996 |
| WO | WO 97/02262 | 7/1996 |
| WO | WO 97/08849 | 3/1997 |
| WO | 98/01963 | 1/1998 |
| WO | 98/17037 | 4/1998 |
| WO | 98/17071 | 4/1998 |
| WO | 98/28864 | 7/1998 |
| WO | 98/33346 | 7/1998 |

OTHER PUBLICATIONS

Agee, "Blind Separation and Capture of Communication Signals Using A Multitarget Constant Modulus Beamformer", Oct. 7, 1989 Proc. IEEE MIlitary Communications Conference, vol. 2, pp. 1-12.

Aschied et al., "An All Digital Receiver Architecture for Bandwidth Efficient Transmission at High Data Rates", 1989, IEEE Transactions on Communications, vol. 37, No. 8, pp. 804-813.

Franks, "Synchronization Subsystems: Analysis and Design", 1981, Digital Communications Satellite/Earth Station Engineering, pp. 294-335.

Friedlander, "Direction Finding Using an Interpolated Array", Apr. 3, 1990, International Conference on Acoustics, Speech, and Signal Processing, vol. 5, pp. 2951-2954.

Friedlander et al., "Direction Finding for Wideband Signals Using an Interpolated Array", 1991, IEEE Publication, pp. 583-587.

Ganz et al., "A Data-Derived Reference Signal Technique for Adaptive Arrays", IEEE Transactions on Communications, vol. 37, No. 9, Sep. 1989, pp. 975-983.

Iltis et al., "A Digital DS Spread-Spectrum Receiver With Joint Channel and Doppler Shift Estimation", IEEE Transactions on Communications, vol. 39, No. 8, Aug. 1991, pp. 1255-1267.

Krishnamurthy et al., "Polling Based Media Access Protocols For Use With Smart Adaptive Array Antennas", 1998 IEEE, pp. 337-344.

Lee et al., "Decision Directed Carrier Recovery—Chapter 16: Carrier Recovery", 1994 Digital Communications, 2nd Edition, Kluwer Academic Pub., pp. 725-736.

Lee et al., "Decision Directed Carrier Recovery—Chapter 17: Timing Recovery", 1994 Digital Communications, 2nd Edition, Kluwer Academic Pub., pp. 737-764.

Lundell et al., "Applications of the Constant Modulus Adaptive Beamformer to Constant and Non-Constant Modulus Signals", Proceedings, 1998 Asilomar Conference on Signals, Systems, and Computers (ACSSC-1988), pp. 432-436.

Muhamed et al., "Direction of Arrival Estimation Using Antenna Arrays", 1996, The Bradley Dept. of Electrical Enginerring, Mobile and Portable Radio Research Group, Section 3.8, pp. 64-71.

vander Veen et al., "A Constant Modulus Factorization Technique for Smart Antenna Applications in Mobile Communications", SPIE 1994 "Advanced Signal Processing Algorithms, Architectures, and Implementations V", vol. 2296, pp. 230-241.

Talwar et al., "Recursive Algorithms for Estimating Multiple Co-Channel Digital Signals Received at an Antenna Array", Proc. Fifth Annual IEEE Dual Use Technologies and Applications Conference.

Papadias et al., "A Space-Time Constant Modulus Algorithm for SDMA Systems", 1996, Proceedings, IEEE 46th Vehicular Technology Conference, pp. 86-90.

Talwar et al., "Blind Estimation of Multiple Co-Channel Digital Signals Arriving at an Antenna Array", 1993, Proc. 27th Asilomar Conference on Signals, Systems, and Computers, vol. 1, pp. 349-342.

Rashid-Farrokhi et al., "Joint Power Control and Beamforming for Capacity Improvement in Wireless Networks With Antenna Array", 1996 IEEE GLOBECOM 1996, vol. 1, pp. 555-559.

Rashid-Farrokhi et al., "Transmit Beamforming for Cellular Communication Systems", Conference on Information Sciences and Systems, CISS-97; Mar. 1997, 4 pages.

Rashid-Farrokhi et al., "Downlink and Uplink Capacity Enhancement in Power Controlled Cellular Systems", Proceedings, 1997 IEEE 47th Vehicular Technology Conference, vol. 2, May 1997, pp. 647-651.

Rashid-Farrokhi et al., "Downlink Power Control and Base Station Assignment", IEEE Communications Letters, vol. 1, No. 4, Jul. 1997, pp. 102-104.

Rashid-Farrokhi et al., "Transmit Diversity and Equalization for Power Controlled Wireless Networks", Conference Record 31st Asilomar Conference on Signals, Systems, and Computers, vol. 1, Nov. 1997, pp. 620-624.

Xu et al., "Throughput Multiplication of Wireless LANs for Multimedia Services: SDMA Protocol Design", 1994, IEEE, pp. 1326-1332.

Swidlehurst et al., "Analysis of a Decision Directed Beamformer", IEEE Transactions on Signal Processing, vol. 43, No. 12, Dec. 1995, pp. 2920-2927.

Zhang et al., "Performance of a Modified Polling Strategy for Broadband Wireless LANs in a Harsh Fading Environment", 1991, GLOBECOM 1991, pp. 1141-1146.

US98/25364, PCT Search Report, May 11, 1999.

Ottersten, "Array Processing for Wireless Communications," Proc. 8th IEEE Signal Processing Workshop on Statistical Signal and Array Proc., Jun. 1996, pp. 466-473.

Farsakh et al., "A Real Time Downlink Channel Allocation Scheme for an SDMA Mobile Radio System," IEEE Int'l Symposium on Personal, Indoor and Mobile Radio Communications, vol. 3, Oct. 18, 1996, pp. 1216-1220.

Farsakh et al., "Channel Allocation and Downlink Beamforming in an SDMA Mobile Radio System," PIMRC '95, Wireless: Merging onto the Information Superhighway, 6th IEEE Int'l Symposium, Toronto, Ont., Canada, Sep. 27-29, 1996, pp. 687-691.

Gerlach, "Base Station Transmitter Antenna Arrays with Mobile to Base Feedback." IEEE Asilomar Conference on Signals, Systems & Computers, 1993, pp. 1432-1436.

Farsakh et al., "A Real Time Downlink Channel Allocation Scheme For an SDMA Mobile Radio System," IEEE International Symposium on Personal, Indoor and Mobile Radio Communications, vol. 3, Oct. 18, 1996, pp. 1215-1220.

Farsakh et al., "Channel Allocation and Downlink Beamforming in an SDMA Mobile Radio System," PIMRC '95, Wireless: Merging onto the Information Superhighway, 6th IEEE International Symposium on Toronto, Ont., Canada, Sep. 27-29, 1995, pp. 687-691.

Gerlach et al., "Base Station Transmitter Antenna Arrays With Mobile to Base Feedback," IEEE Asilomar Conference on Signals, Systems & Computers, 1993, pp. 1432-1436.

European Examination Report dated Oct. 18, 2002.

\* cited by examiner

NULL DEEPENING FOR AN ADAPTIVE ANTENNA BASED COMMUNICATION STATION

FIELD OF INVENTION

This invention relates to the field of wireless communication systems, and more specifically, to a method and apparatus for decreasing the transmitted power aimed at an interferer during transmission or the sensitivity to signals transmitted from the interferer during reception in order for a communications station to communicate to or from one or more remote subscriber units, the communication station having an adaptive antenna array and adaptive smart antenna processing.

BACKGROUND TO THE INVENTION

Adaptive smart antenna processing may be used in a communication station (e.g., a base station) equipped with multiple antennas to either reject interference when communicating from a subscriber unit to the communication station (i.e., on the uplink) or to deliver power in a spatially or spatio-temporally selective manner when communicating from the communication station to a subscriber unit (i.e., on the downlink). With smart antenna communication systems that use linear spatial processing for the adaptive smart antenna processing, during uplink communications, one applies amplitude and phase adjustments, typically but not necessarily in baseband to each of the signals received at the antenna array elements to select (i.e., preferentially receive) the signals of interest while minimizing any signals or noise not of interest—that is, the interference. Such baseband amplitude and phase adjustment can be described by a complex valued weight, the receive weight, and the receive weights for all elements of the array can be described by a complex valued vector, the receive weight vector. Similarly, the downlink signal is processed by adjusting the amplitude and phase of the baseband signals that are transmitted by each of the antennas of the antenna array. Such amplitude and phase control can be described by a complex valued weight, the transmit weight, and the weights for all elements of the array by a complex valued vector, the transmit weight vector. In some systems, the receive (and/or transmit) weights include temporal processing, and in such cases, the receive (and/or transmit) weights may be functions of frequency and applied in the frequency domain or, equivalently, functions of time applied as convolution kernels. Alternatively, each convolution kernel, if for sampled signals, may itself be described by a set of complex numbers, so that the vector of convolution kernels may be re-written as a complex values weight vector, which, for the case of there being M antennas and each kernel having K entries, would be a vector of KM entries.

Many methods are known for performing interference rejection or selective power delivery. Examples include least-squares beamforming and zero-forcing beamforming. Selective power delivery must balance competing goals. In general, the power delivered to one remote user cannot be simultaneously maximized while the power delivered to another remote user is minimized. More generally, if several remote users require power minimization (i.e., nulling), the relative power delivered to each must be traded off. This tradeoff can be based on a number of factors. For example, for a given interferer (which might be a co-channel user), a deeper null (i.e., decreased transmitted power aimed at an interferer during transmission or decreased sensitivity to signals transmitted from the interferer during reception) may be required for a remote user co-participating in the spatial channel established at the base station than for a remote user communicating with a different base station.

A disadvantage of known methods, such as least-squares and zero-forcing, is their inability to flexibly perform this tradeoff. Zero-forcing methods attempt to direct perfect nulls towards all interferers, regardless of the power delivered to the desired remote user. Least-squares methods minimize a cost function which, when the uplink strategies are used to determine downlink strategies, on the downlink directs strongest nulls to remote users who were received most strongly on the uplink. Neither zero-forcing nor least-squares behavior may be appropriate for some systems.

A particular case where least-squares nulling behavior is undesirable occurs when subscriber units are subject to the "near/far problem." In the near/far problem, one subscriber unit, say one denoted SU1, is far from the base station while a second subscriber unit, say one denoted SU2, is close. When the downlink weight vector, denoted w1, is computed for SU1, signals from SU2 are seen as interference and a null is formed towards SU2. The depth of the null in the direction of SU2 is limited by noise and other factors, including the possibility that the transmitted powers of subscriber units are adjusted such that equal power levels are received by the base station. If high power is used to reach SU1 during base station transmit, then excessive signal levels leaking "through" in the imperfect null can disturb SU2. A deeper null towards SU2 is therefore desirable.

A disadvantage of zero-forcing methods is the need for the base station to have complete knowledge of all remote user and interferer spatial signatures (or spatio-temporal signatures). The receive spatial signature and the receive spatio-temporal signature characterizes how the base station array receives signals from a particular subscriber unit in the absence of any interference or other subscriber units. The transmit spatial signature and the transmit spatio-temporal signature of a particular remote user characterizes how the remote user receives signals from the base station in the absence of any interference. See U.S. Pat. No. 5,592,490 entitled SPECTRALLY EFFICIENT HIGH CAPACITY WIRELESS COMMUNICATION SYSTEMS, to Barratt et al., assigned to the assignee of the present invention and incorporated herein by reference, and U.S. Pat. No. 5,828,658 entitled SPECTRALLY EFFICIENT HIGH CAPACITY WIRELESS COMMUNICATION SYSTEMS WITH SPATIO-TEMPORAL PROCESSING, to Ottersten et al., also assigned to the assignee of the present invention and incorporated herein by reference, for spatial processing and spatio-temporal processing methods that use spatial and spatio-temporal signatures. Note that because a signature may be a spatial signature or a spatio-temporal signature, depending on whether the smart antenna processing is spatial or spatio-temporal, the term signature will be used herein, and whether the signature is spatial or spatio-temporal will depend on whether the processing is spatial or spatio-temporal, and whether the signature is a transmit or a receive signature will depend on the context, and which signature will be clear to those of ordinary skill in the art from the context.

Determining all spatial signatures of all remote users and all interferers may often be impossible to carry out accurately if any of the interferers are weak or have a signal structure that is a priori unknown, or because of computational power limitations.

In the uplink direction, increasing the depth of a null (i.e, decreasing sensitivity to signals received from a particular interferer) is desirable when the uplink strategy, for example the uplink weight vector, computed from a previous burst is used in predictive mode, e.g., for new data. When uplink remote users are executing power control, for example to control received power at the base station or to reduce transmit power during periods of voice or data inactivity, their uplink power may vary widely from burst to burst. Similar effects occur in fading environments. Thus, if a least-squares approach is used, the null depth obtained from a strategy computed for the previous burst may be inappropriate for the current burst.

Thus there is a need in the art for a flexible method for directing precise and deep nulls on the uplink or downlink direction. There also is a need in the art for a method and apparatus for estimating one or more signatures in the direction of one or more interferers to use, for example, for such null deepening. There also is a need for a method for using a signature estimate of an interferer for directing precise and deep nulls in the direction of the interferer. There also is a need in the art for a method for directing precise and deep nulls in the direction of one or more interferers while substantially maintaining the other nulling and gain patterns of a provided adaptive smart antenna processing strategy.

SUMMARY

An advantage of the present invention is that it provides a flexible method for directing precise and deep nulls (i.e., decreasing the transmitted power aimed at an interferer during transmission or decreasing the sensitivity to signals transmitted from the interferer during reception) on the uplink or downlink direction.

Another advantage of the present invention is that it provides a method and apparatus for estimating one or more signatures in the direction of one or more interferers.

Another advantage of the present invention is that it provides a method for using a signature estimate of an interferer for directing precise and deep nulls in the direction of the interferer.

Another advantage of the present invention is that it provides a method for directing precise and deep nulls in the direction of one or more interferers while substantially maintaining the other nulling and gain patterns of a provided adaptive smart antenna processing strategy.

Another advantage of the present invention is that it provides a null deepening method that essentially requires only an estimate signature of any interferer to deepen the null to that interferer, without needing a full set of signatures, and in particular, without needing the signature of the desired remote user.

One aspect of the invention is a method for determining, in a communication station using multiple antennas, improved uplink or downlink processing strategies, for example in the form of uplink or downlink weights for linear mart antenna processing, for which one or more nulls have a controlled depth. The method can be applied as a modification to a variety of known techniques for uplink and downlink strategy computation. The method needs as side information only the signatures of those remote users to which controlled nulls are to be directed. Other nulls in the array pattern, for which no signature estimates may be available, are substantially preserved. Another aspect of the invention includes estimating the required signatures. Another aspect of the invention modifies existing uplink and downing strategy computation methods by injecting into the received signal sequence a synthetic signal whose signature equals that of the estimated remote user direction, and whose power is proportional to the desired null depth.

To overcome the limitations on null depth imposed by having a limited number of array samples, in an improved version of the invention, the signatures in the directions to be nulled are estimated by combining measurements over several bursts. An aspect of the invention identifies a particular type of signature estimation technique that combines favorably with the synthetic signal-injection method.

BRIEF DESCRIPTION OF THE DRAWINGS

The present invention will be more fully understood from the description of the preferred embodiments of the invention, which, however, should not be taken to limit the invention to any specific embodiment but are for purposes of explanation and to provide a better understanding of the inventive apparatus and method. The preferred embodiments may be better understood with reference to the following figures.

DETAILED DESCRIPTION OF THE PREFERRED EMBODIMENTS

Adaptive Smart Antenna Processing

Figure 1:
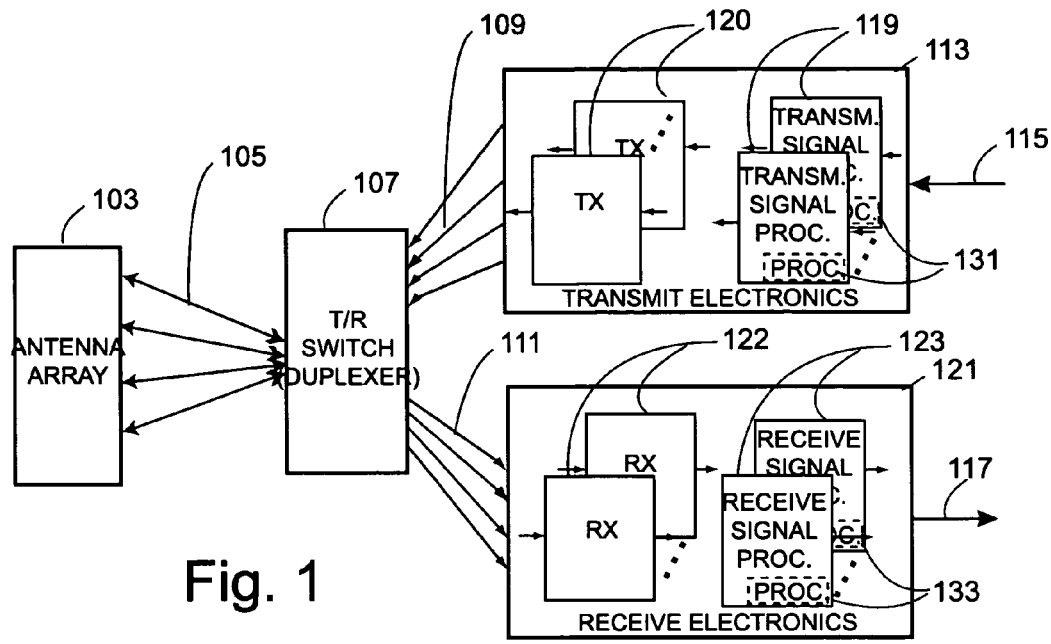
FIG. 1 is a functional block diagram of a multi-antenna transceiver system which includes elements suitable for implementing the method of the present invention.

The invention is directed to a processing method for altering the transmit or receive weights used by a communication station to define a transmitted signal or to process a received signal in order to deepen or otherwise manipulate the depth of a null formed to mitigate the effects of one or more known interferers. The interferer may or may not be another remote user sharing the same communication channel with the same base station. The invention may be implemented in a communication station that includes a receiver, an array of antennas and means for adaptive smart antenna processing of received signals. The invention may also be implemented in a communication station that includes a transmitter, an array of antennas, and means for adaptive smart antenna processing of transmitted signals. In a preferred embodiment, the communication station includes a transceiver and the capability of implementing both uplink and downlink adaptive smart antenna processing.

When receiving a signal from a subscriber (remote) unit, the signals received by each of the antenna array elements are combined by the adaptive smart antenna processing elements to provide an estimate of a signal received from that subscriber unit. In the preferred embodiment, the smart antenna processing comprises linear spatial processing, wherein each of the complex-valued (i.e., including in-phase I and quadrature Q components) signals received from the antenna elements is weighted in amplitude and phase by a weighting factor and the weighted signals are then summed to provide the signal estimate. The adaptive smart antenna processing scheme (i.e., the strategy) can then be described by a set of complex valued weights, one for each of the antenna elements. These complex valued weights can be described as a single complex valued vector of M elements, where M is the number of antenna elements. Thus, in the linear case, the smart antenna processing is designed to determine a set of weights such that the sum of the products of the weights times the antenna element signals provides an estimate of the remote user's transmitted signal which satisfies some prescribed "estimation quality" measure.

This representation of the adaptive smart antenna processing can be extended to include spatio-temporal processing, where the signal at each antenna element, rather than being weighted in amplitude and phase, is filtered by a complex valued filter, typically for purposes of time equalization. In such a method, each filter can be described by a complex-valued transfer function or convolving function. The adaptive smart antenna processing of all elements can then be described by a complex valued M-vector of M complex valued convolving functions.

Several methods are known for determining the weighting vectors to be applied when processing received signals. These include methods that determine the directions of arrival of signals from subscriber units, and methods that use the spatial or spatio-temporal characteristics of subscriber units, for example, the spatial or spatio-temporal signatures. See for example U.S. Pat. Nos. 5,515,378 and 5,642,353, entitled "SPATIAL DIVISION MULTIPLE ACCESS WIRELESS COMMUNICATION SYSTEMS", to Roy, et al., assigned to the assignee of the present invention and the contents of which are incorporated herein by reference, for methods that use directions of arrival. See also the above-referenced U.S. Pat. Nos. 5,592,490 and 5,828,658 for methods that use spatial and spatio-temporal signatures.

"Blind" methods determine the weights from the signals themselves, but without resorting to a priori knowledge such as training signals or silent periods, that is, without determining what weights can best estimate a known symbol sequence (or in the case of the period silence, the absence of a known sequence). Such blind methods typically use some known characteristic of the signal transmitted by the subscriber unit to determine the best receive weights to use by constraining the estimated signal to have this property, and hence are sometimes referred to as property restoral methods.

Property restoral methods in turn can be classified into two groups. Simple property restoral methods restore one or more properties of the signal without completely reconstructing the modulated received signal, for example by demodulating and then remodulating. More complex restoral methods typically rely upon reconstruction of the received signal.

Property restoral methods determine a signal (a "reference signal") that is constrained to the required property and then determine a set of weights corresponding to the reference signal, such that if the reference signal was transmitted by a remote user, the signals at the antenna elements of the receiving array would be acceptably "close" to the signals actually received. One example of a simple restoral method is the constant modulus (CM) method, which is applicable to communication systems that use a modulation scheme having a constant modulus, including, for example phase modulation (PM), frequency modulation (FM), phase shift keying (PSK) and frequency shift keying (FSK). The CM method has also been shown to be applicable to non-CM signals. Other partial property restoral techniques include techniques that restore the spectral properties of the signal, such as the signal's spectral self-coherence.

"Decision directed" (DD) methods construct a reference signal by making symbol decisions (e.g., demodulating) the received signal. Such decision directed methods use the fact that the modulation scheme of the transmitted subscriber unit signal is known, and then determine a signal (a "reference signal") that is constrained to have the characteristics of the required modulation scheme. In such a case, the reference signal production process includes making symbol decisions. Weights are determined that produce a reference signal, that if transmitted by a remote user, would produce signals at the antenna elements of the array that are acceptably "close" to the signals actually received. See, for example, U.S. patent application Ser. No. 08/729,390, entitled "METHOD & APPARATUS FOR DECISION DIRECTED DEMODULATION USING ANTENNA ARRAYS & SPATIAL PROCESSING" to Barratt, et al., and serial no. 09/153,110, entitled "METHOD FOR REFERENCE SIGNAL GENERATION IN THE PRESENCE OF FREQUENCY OFFSETS IN A COMMUNICATION STA- TION WITH SPATIAL PROCESSING" to Petrus, et al., both of which are assigned to the assignee of the present invention and the contents of which are incorporated herein by reference, for descriptions of systems that use decision directed weight determination methods.

As previously mentioned, weight determining schemes also are known that use training data, that is, data whose symbols are known a priori. The training data (possibly with a timing offset or frequency offset, or both applied) is then used as a reference signal to determine the smart antenna processing strategy (e.g., the weights). Therefore, reference signal based methods include the case in which the reference signal includes training data, the case in which the reference signal includes a signal constrained to have some property of the transmitted signal, and the case in which the reference signal includes constructing a signal based on making symbol decisions.

Non-linear uplink and downlink processing strategies also are known. In the uplink direction, such methods typically include demodulation and act to determine an estimate of the symbols transmitted by a desired remote user from the set of signals received at the antenna elements of the communication station. One known example of such a processing scheme is based on a Viterbi algorithm using branch metrics. In this regard, it is noted that the present invention is not limited to linear spatial and spatio-temporal processing methods that include weight determining, but also is equally applicable to non-linear methods such as those based on Viterbi algorithms and branch metrics, which may not necessarily include determining weights.

In theory, adaptive smart antenna processing permits more than one communication link to exist in a single "conventional" communication channel so long as the subscriber units that share the conventional channel can be spatially (or spatio-temporally) resolved. A conventional channel includes a frequency channel in a frequency division multiple access (FDMA) system, a time slot in a time division multiple access (TDMA) system (which usually also includes FDMA, so the conventional channel is a time and frequency slot), and a code in a code division multiple access (CDMA) system. The conventional channel is then said to be divided into one or more "spatial" channels, and when more than one spatial channel exists per conventional channel, the multiplexing is called space division multiple access (SDMA). SDMA is used herein to include the possibility of adaptive smart antenna processing, both with one and with more than one spatial channel per conventional channel.

Base Station Architecture

The preferred embodiment of the inventive method and apparatus is implemented in a communication receiver, in particular, a Personal Handyphone System (PHS)-based antenna-array communication station (transceiver) such as that shown in FIG. 1, with M antenna elements in the antenna array. The PHS standard is described, for example, in the Association of Radio Industries and Businesses (ARIB, Japan) Preliminary Standard, Version 2, RCR STD-28 and variations are described in Technical Standards of the PHS Memorandum of Understanding Group (PHS MoU—see http://www.phsmou.or.jp). The preferred embodiments of the present invention may be implemented in two versions of the communication station of FIG. 1, one aimed at low-mobility PHS system, with M=4, and another, aimed at a wireless local loop (WLL) system, with a variable number, with typically M=12.

While systems having some elements similar to that shown in FIG. 1 may be prior art, a system such as that of FIG. 1 with elements 131 and 133 capable of implementing the inventive method is not prior art. Note that the present invention is in no way restricted to using the PHS air interface or to TDMA systems, but may be utilized as part of any communication receiver that includes adaptive smart antenna processing means, including CDMA systems using the IS-95 air interface and systems that use the common GSM air interface.

In the system of FIG. 1, a transmit/receive ("TR") switch 107 is connected between an M-antenna array 103 and both transmit electronics 113 (including one or more transmit signal processors 119 and M transmitters 120), and receive electronics 121 (including M receivers 122 and one or more receive signal processors 123). Switch 107 is used to selectively connect one or more elements of antenna array 103 to the transmit electronics 113 when in the transmit mode and to receive electronics 121 when in the receive mode. Two possible implementations of switch 107 are as a frequency duplexer in a frequency division duplex (FDD) system, and as a time switch in a time division duplex (TDD) system.

The PHS form of the preferred embodiment of the present invention uses TDD. The transmitters 120 and receivers 122 may be implemented using analog electronics, digital electronics, or a combination of the two. The preferred embodiment of receivers 122 generate digitized signals that are fed to signal processor or processors 123. Signal processors 119 and 123 incorporate software and/or hardware for implementing the inventive method and may be static (always the same processing stages), dynamic (changing processing depending on desired directivity), or smart (changing processing depending on received signals). In the preferred embodiments of the invention, processors 119 and 123 are adaptive. Signal processors 119 and 123 may be the same DSP device or DSP devices with different programming for the reception and transmission, or different DSP devices, or different devices for some functions, and the same for others. Elements 131 and 133 are for implementing the method of the present invention for downlink and uplink processing, respectively, in this embodiment, and include programming instructions for implementing the processing methods.

Note that while FIG. 1 shows a transceiver in which the same antenna elements are used for both reception and transmission, it should be clear that separate antennas for receiving and transmitting may also be used, and that antennas capable of only receiving or only transmitting or both receiving and transmitting may be used with adaptive smart antenna processing.

The PHS system is an 8 slot time division multiple access (TDMA) system with true time division duplex (TDD). Thus, the 8 timeslots are divided into 4 transmit (TX) timeslots and 4 receive (RX) timeslots. This implies that for any particular channel, the receive frequency is the same as the transmit frequency. It also implies reciprocity, i.e., the propagation path for both the downlink (from base station to users' remote terminals) and the uplink (from users' remote terminals to base station) is identical, assuming minimal motion of the subscriber unit between receive timeslots and transmit timeslots. The frequency band of the PHS system used in the preferred embodiment is 1895–1918.1 MHz. Each of the 8 timeslots is 625 microseconds long. The PHS system includes a dedicated frequency and timeslot for a control channel on which call initialization takes place. Once a link is established, the call is handed to a service channel for regular communications. Communication occurs in any channel at the rate of 32 kbits per second (kbps), a rate termed the "full rate". Less than full rate communication is also possible, and the details of how to modify the embodiments described herein to incorporate less than full rate communication would be clear to those of ordinary skill in the art.

In the PHS used in the preferred embodiment, a burst is defined as the finite duration RF signal that is transmitted or received over the air during a single timeslot. A group is defined as one set of 4 TX and 4 RX timeslots. A group always begins with the first TX timeslot, and its time duration is 8×0.625=5 msec.

The PHS system uses ($\pi/4$ differential quaternary (or quadrature) phase shift keying ($\pi/4$ DQPSK) modulation for the baseband signal. The baud rate is 192 kbaud. There are thus 192,000 symbols per second.

Figure 2:
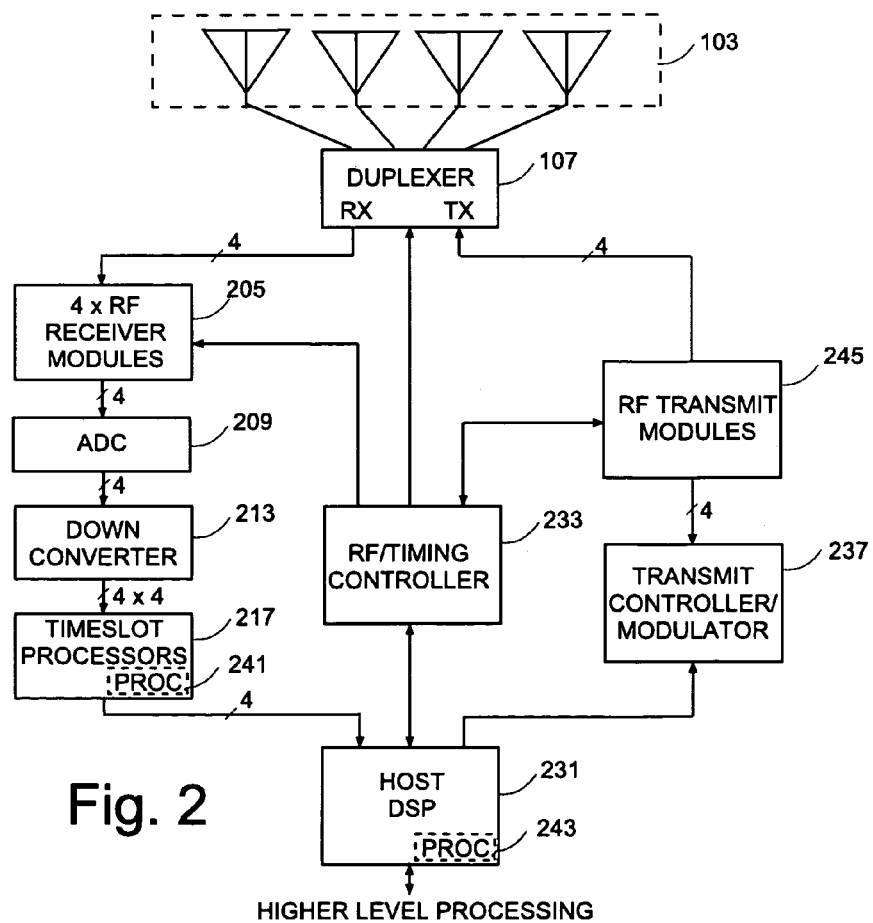
FIG. 2 is a more detailed block diagram of a transceiver that includes a signal processor capable of executing a set of instructions for implementing the method of the present invention.

FIG. 2 is a more detailed block diagram of a transceiver that includes a signal processor capable of executing a set of instructions for implementing the method of the present invention. This is the version of the FIG. 1 system suitable for use in a low-mobility PHS system. In FIG. 2, a plurality of M antennas 103 are used, where M=4. More or fewer antenna elements may be used. The outputs of the antennas are connected to a duplexer switch 107, which in this TDD system is a time switch. When receiving, the antenna outputs are connected via switch 107 to a receiver 205, and are mixed down in analog by RF receiver modules 205 from the carrier frequency (around 1.9 GHz) to an intermediate frequency ("IF"). This signal is then digitized (sampled) by analog to digital converters ("ADCs") 209. The result is then down converted digitally by digital downconverter 213 to produce a four-times oversampled complex valued (in phase I and quadrature Q) sampled signal. Thus, elements 205, 209 and 213 correspond to elements that might be found in receiver 122 of FIG. 1. For each of the M receive timeslots, the M downconverted outputs from the M antennas are fed to a digital signal processor (DSP) device 217 (hereinafter "timeslot processor") for further processing. In the preferred embodiment, commercial DSP devices are used as timeslot processors, one per receive timeslot per spatial channel.

The timeslot processors 217 perform several functions, which may include the following: received signal power monitoring, frequency offset estimation/correction and timing offset estimation/correction, smart antenna processing (including determining receive weights for each antenna element to determine a signal from a particular remote user, in accordance with the present invention), and demodulation of the determined signal. The version of the uplink processing method of the invention as implemented in each timeslot processor 217 in the embodiment of FIG. 2 is shown as block 241.

The output of the timeslot processor 217 is a demodulated data burst for each of the M receive timeslots. This data is sent to host DSP processor 231 whose main function is to control all elements of the system and interface with the higher level processing (i.e., processing which deals with what signals are required for communications in the different control and service communication channels defined in the PHS communication protocol). In the preferred embodiment, host DSP 231 is a commercial DSP device. In one implementation of the present invention, timeslot processors 217 send the determined receive weights to host DSP 231. Note that if desired, the receive weights may also be determined by software specifically implemented in host DSP 231.

RF controller 233 interfaces with the RF transmit elements, shown as block 245 and also produces a number of timing signals that are used by both the transmit elements and the modem. RF controller 233 receives its timing parameters and other settings for each burst from host DSP 231.

Transmit controller/modulator 237 receives transmit data from host DSP 231. Transmit controller 237 uses this data to produce analog IF outputs which are sent to RF transmitter (TX) modules 245. The specific operations performed by transmit controller/modulator 237 include: converting data bits into a complex valued ($\pi/4$ DQPSK) modulated signal; up-converting to an intermediate frequency (IF); weighting by complex valued transmit weights obtained from host DSP 231; and, converting the signals to be transmitted using digital to analog converters ("DACs") to form analog transmit waveforms which are provided to transmit modules 245.

The downlink processing method of the invention is implemented in the embodiment of FIG. 2 in host DSP 231, and is shown as block 243. In alternate versions, the downlink processing method is implemented in the timeslot processors 217 and in another version, it is implemented in transmit controller/modulator 237.

Transmit modules 245 upconvert the signals to the transmission frequency and amplify the signals. The amplified transmission signal outputs are coupled to the M antennas 103 via duplexer/time switch 107.

In describing the inventive methods, the following notation is used. Given M antenna elements (M=4 in one implementation, and 12 in another embodiment), let $z_1(t)$, $z_2(t), \ldots, z_M(t)$ be the complex valued responses (that is, with in-phase I and quadrature Q components) of the first, second, . . . , M'th antenna elements, respectively, after down-conversion, that is, in baseband, and after sampling (four-times oversampling in the preferred embodiment). In the above notation, but not necessarily required for the present invention, t is discrete. These M time-sampled quantities can be represented by a single M-vector z(t) with the i'th row of z(t) being $z_i(t)$. For each burst, a finite number of samples, say N, is collected, so that $z_1(t), z_2(t), \ldots, z_M(t)$ can each be represented as a N-row vector and z(t) can be represented by a M by N matrix Z. In much of the detailed description presented hereinafter, such details of incorporating a finite number of samples are assumed known, and how to include these details would be clear to those of ordinary skill in the art.

Assume signals are transmitted to the base station from $N_s$ remote users all operating on the same (conventional) channel. In particular, assume that one of these, a particular subscriber unit of interest, transmits a signal s(t). Linear adaptive smart antenna processing, which is used in the preferred embodiment of the invention, includes taking a particular combination of the I values and the Q values of the received antenna element signals $z_1(t), z_2(t), \ldots, z_M(t)$ in order to extract an estimate of the transmitted signal s(t). Such complex valued weights may be represented by the receive weight vector for this particular subscriber unit, denoted by a complex valued weight vector $w_r$, with $i^{th}$ element $w_{ri}$. The estimate of the transmitted signal from the remote unit may then be represented as:

$$s(t) = \sum_{i=1}^{M} w'_{ri} z_i(t) = w_r^H z(t) \quad (1)$$

where $w'_{ri}$ is the complex conjugate of $w_{ri}$ and $w_r^H$ is the Hermitian transpose (that is, the transpose and complex conjugate) of receive weight vector $w_r$. Eq. 1 is called a copy signal operation, and the signal estimate s(t) thus obtained is called a copy signal.

The spatial processing described by Eq. 1 may be re-written in vector form for the case of N samples of M-vector signals z(t) and N samples of the transmitted signal s(t) being estimated. In such a case, let s be a (1 by N) row vector of the N samples of s(t). The copy signal operation of Eq. 1 may then be re-written as $s = w_r^H Z$.

In embodiments which include spatio-temporal processing, each element in the receive weight vector is a function of time, so that the weight vector may be denoted as $w_r(t)$, with ith element $w_{ri}(t)$. The estimate of the signal may then be expressed as:

$$s(t) = \sum_{i=1}^{M} w'_{ri}(t) * z_i(t) \quad (2)$$

where the operator "*" represents the convolution operation. Spatio-temporal processing may combine time equalization with spatial processing, and is particularly useful for wideband signals. Forming the estimate of the signal using spatio-temporal processing may equivalently be carried out in the frequency (Fourier transform) domain. Denoting the frequency domain representations of s(t), $z_i(t)$, and $w_{ri}(t)$ by S(k), $Z_i(k)$, and $W_i(k)$, respectively, where k is the discrete frequency value:

$$S(k) = \sum_{i=1}^{M} W'_{ri}(k) Z_i(k). \quad (3)$$

With spatio temporal processing, the convolution operation of Equation (2) is usually finite and when performed on sampled data, equivalent to combining the spatial processing with time equalization using a time-domain equalizer with a finite number of equalizer taps. That is, each of the $w_{ri}(t)$ has a finite number of values of t and equivalently, in the frequency domain, each of the $W_i(k)$ has a finite number of k values. If the length of the convolving functions $w_{ri}(t)$ is K, then rather than determining a complex valued M-weight vector $w_r$, one determines a complex valued M by K matrix $W_r$ whose columns are the K values of $w_r(t)$.

Alternatively, a spatial weight determining method can be modified for spatio-temporal processing according to a weight matrix by re-expressing the problem in terms of matrices and vectors of different sizes. As throughout this description, let M be the number of antenna elements, and N be the number of samples. Let K be the number of time equalizer taps per antenna element. Each row vector of N samples of the (M by N) received signal matrix Z can be rewritten as K rows of shifted versions of the first row to produce a received signal matrix Z of size (MK by N), which when pre-multiplied by the Hermitian transpose of a weight vector of size (MK by 1), produces an estimated received signal row vector of N samples. The spatio-temporal problem can thus be re-expressed as a weight vector determining problem.

For example, for covariance based methods, the weight vector is a "long" weight vector of size (MK by 1), the covariance matrix $R_{zz} = ZZ^H$ is a matrix of size (MK by MK), and the correlation of the antenna signals Z with some signal represented by a (1 by N) row vector s is $r_{zs} = Zs^H$, a long vector of size (MK by 1). Rearranging terms in the "long" weight vector provides the required (M by K) weight matrix.

A downlink (i.e., transmit) processing strategy using adaptive smart antenna processing includes transmitting a signal, denoted in the finite sampled case by a (1 by N) vector s, from the communication station to a particular remote user by forming a set of antenna signals (typically, but not necessarily in baseband). Linear smart antenna processing determines the antenna signals as:

$$Z = w_t s,$$

where $w_t$ is the downlink (or transmit) weight vector. When SDMA is used to transmit to several remote users on the same (conventional) channel, the sum of $w_{ti}$ for different signals $s_i$ aimed at different remote users is formed, to be transmitted by the M antenna elements.

Note that a downlink strategy, for example including determining the downlink weights $w_t$, may be implemented by basing it on an uplink strategy, for example uplink weights, together with calibration data. In this situation, the calibration accounts for differences in the receive and transmit electronic paths for the different antenna elements. The downlink strategy may also be found from the uplink strategy by using the transmit spatial signatures of the remote users, or by other known methods. Again, the weight vector formulation may be used for both linear spatial processing and linear spatio-temporal processing.

Consider a communications station communicating with $N_s$ remote users on any channel. On the uplink, for an M antenna system, the M received signals at the base station can be stacked into an (M by 1) received signal vector z(t) which may be modeled as $$z(t) = \sum_{i=1}^{N_s} a_i s_i(t) + v(t), \quad (4)$$

where t is time, which in the preferred embodiment is discrete, $s_i(t)$, i=1, ..., $N_s$, denotes the signal (preferably in baseband) at time t transmitted by the ith of $N_s$ remote users, $a_i$ is the spatial (or spatio-temporal) signature (a complex valued M-vector) of the ith remote co-channel user, and v(t) denotes additive noise (which may include other interfering signals, viewed as noise for any remote user). Note that the signature of any user is the signal received at the M antenna elements in the absence of noise and the absence of any other interfering users when the user transmits a unit impulse signal (see above referenced above-referenced U.S. Pat. Nos. 5,592,490 and 5,828,658). In matrix form the above signal model can be represented as $$z(t) = As(t) + v(t). \quad (5)$$

where $$A = [a_1 a_2 \ldots a_{Ns}], \text{ and } s(t) = [s_1(t) s_2(t) \ldots s_{Ns}(t)]^T. \quad (6)$$

with the superscript T denoting the matrix transpose.

Processing Strategy Computation Methods

The preferred embodiment of the invention improves a method for computing an uplink or downlink processing strategy that uses as inputs the received antenna signal data and typically a reference signal, and that takes into account the interference environment present in the received antenna signal data for interference mitigation. The improvement is to deepen or otherwise modify the null depth the strategy provides for mitigating the effects of any one or more known interferers. As would be known to those in the art, interference mitigating strategy determining methods explicitly or implicitly use one or more characteristic features of the received antenna data. Depending on the known strategy computation method, the input signal data may be explicitly reduced to one or more particular characteristic feature that the known method explicitly uses for its computation. For example, for methods that use the spatial or spatio-temporal covariance matrix of the input, the data may be reduced to the spatial or spatio-temporal covariance matrix of the data. Other methods may be based on other properties and in such cases the input signal data may be reduced to the particular feature or property which the known strategy method utilizes. Yet other methods, while implicitly dependent on some property (e.g., spatio-temporal covariance) of the received signal, do not require explicit estimation of the property such as the covariance.

Since some of the discussion below applies for both receive and transmit strategy, the "r" or "t" subscripts are omitted in such quantities as the weight vectors w. Such subscripts may be used explicitly to identify uplink or downlink processing, and their addition will be clear from the context to those of ordinary skill in the art.

Let Z be the matrix of received antenna array signals, preferably but not necessarily in baseband. Let $s_1$, be a (1 by $N_1$) reference signal vector of $N_1$ samples. A reference signal $s_1$, may be a known training sequence, or, in decision directed methods, a signal constructed to have the same known modulation structure as the signal transmitted by the subscriber unit, or for property restoral methods, a signal that is constrained to have the required property.

Figure 3:
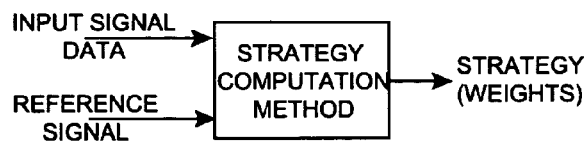
FIG. 3 is a block diagram showing a strategy computation method and apparatus having as input a set of input signal data and a reference signal for the set of input data.
Figure 4:
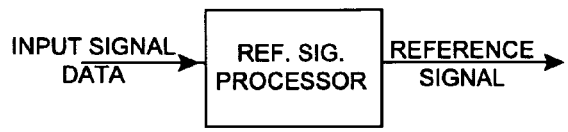
FIG. 4 is a block diagram illustrating a reference signal generator that may be used in any of the embodiments of the invention.
Figure 5:
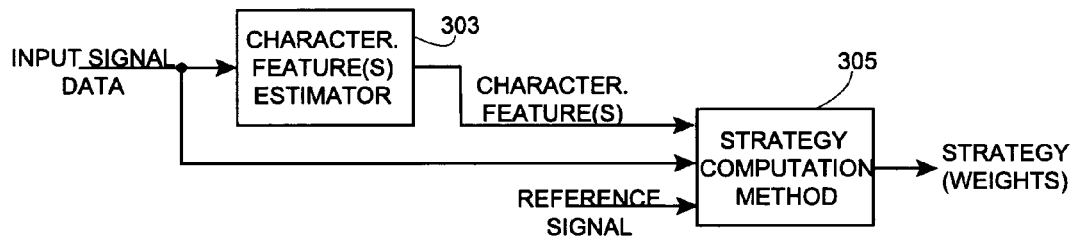
FIG. 5 is a block diagram illustrating a strategy computation method and apparatus that uses estimates of one or more characteristic features of a set of signal data.

The invention may be applied to deepen the nulls resulting from uplink or downlink strategies determined with any strategy computation method. Thus, in all of the embodiments of the invention to be described herein, a known strategy (e.g., weight) determining process is used that computes an uplink or a downlink strategy based on received signal inputs Z from the antenna array elements. Many such methods also use reference signal, denoted $s_1$ determined for the remote user signal of interest from the received signal data Z. Such a strategy determining method is shown in FIG. 3, which is marked prior-art, but is only prior art without the modifications described herein. The reference signal is typically extracted from a set Z of received data as shown in FIG. 4. FIG. 5 is one case of the system of FIG. 3 wherein the method explicitly uses as an input at least one of the characteristic features of the set of received signal data Z, so in FIG. 5, the set of input data is further operated upon to obtain one or more characteristic features (e.g., the covariance, the principal components of the covariance matrix, a particular feature of the data, etc.) of the data, which is then explicitly used in the known strategy (e.g., weight) determining method.

One example of a weight determining method that has the structure shown in FIG. 5 is the well known least squares (MSE) technique computes the uplink or downlink weights by solving the minimization problem:

$$w = \mathrm{argmin}_w \|w^H Z - s_1\|^2 = (R_{zz})^{-1} r_{zs} = (ZZ^H)^{-1} Z s_1^H, \quad (7A)$$

where $R_{zz} = ZZ^H$ is the spatial (or spatio-temporal) covariance matrix of the antenna signals, $\| \ \|$ denotes the vector norm, and $r_{zs} = Z s_1^H$ is the cross correlation between the antenna signals and the reference signal. The method of Eq. (7A) is called the minimum mean squared error (MMSE) method herein, and uses the covariance $R_{zz}$ of the input signal data as the characteristic feature for weight determining. Thus, calculation of the weights according to Eq. (7A) requires having data corresponding to the signals received at the antenna elements and a reference signal. In practice, this typically entails identifying the reference signal data and extracting it from a data burst, forming the covariance matrix for the received signals in the data burst, forming the cross correlation term, and solving for the weights.

In practice, for example in a mobile PHS, because of limited computational power, only a small number of the 960 samples making up a received signal burst are used to determine $R_{zz}^{-1}$. In addition, the samples are determined at the baud points rather than being oversampled. Using only a small number of samples to determine weights may cause what is called "overtraining" herein: the weights performing well on the data containing the reference signal but not on new data, i.e., while the weights extract the desired signal energy and reject interference, the weights may perform poorly on new data. An improvement to the least squares technique which can assist in this situation includes a process termed "diagonal loading" (see, for example, B. L. Carlson: "Covariance matrix estimation errors and diagonal loading in adaptive arrays," *IEEE Transactions on Aerospace and Electronic Systems*, vol. 24, no. 4, July 1988), by which a diagonal adjustment is added as follows:

$$w = (ZZ^H + \gamma I)^{-1} Z s_1^H, \quad (7B)$$

where $\gamma$ is a small adjustable factor used to improve the performance of the least squares solution by reducing sensitivity to statistical fluctuations in Z.

The methods described by Eq. (7B) also is of the structure shown in FIG. 5, again with the characteristic feature being the spatial (or spatio-temporal) covariance $R_{zz} = ZZ^H$. Other uplink processing methods are known that use the noise-plus-interference covariance matrix, denoted $R_{\nu\nu}$, rather than the noise-plus-interference-plus-signal covariance matrix $R_{zz}$. Such methods include some noise plus interference covariance estimator which uses the received data (containing the signal plus interference plus noise) and the reference signal for the desired user to determine $R_{\nu\nu}$.

The invention includes two main aspects: (i) modifying the uplink or downlink strategy to realize an improved null, and (ii) accurately estimating the signature in the direction where a modified (e.g., deeper) null is desired followed by null deepening based on the estimate.

Null depth is generally limited by two effects. The first effect is the "natural" null depth of the uplink or downlink strategy. For example, when the signatures of the remote user and interferer are highly correlated, when the interferer power is not too strong, and when the signal-to-noise ratio (SNR) is modest, an uplink strategy based on maximizing the signal-to-interference-plus-noise ratio (SINR) will not direct particularly deep nulls towards the interferer. One aim of the present invention is to deepen the nulls formed under these conditions.

While a preferred embodiment is described in detail for deepening a null based on known or estimated signatures towards which the nulls are to be deepened, various embodiments are possible. They include using: synthetic signal injection, synthetic signal injection only for the "noise plus interference" estimation block, low-rank update of the noise plus interference estimate, and strategy orthogonalization. In the latter case, the uplink weights for two remote users that share a spatial channel are combined to construct weights with improved nulling performance, while again substantially preserving the rest of the null and gain pattern. These embodiments are detailed hereinunder.

The described methods for null deepening use a known or estimated signature. Known signature estimation methods such as simple (e.g., maximum likelihood) signature estimation of the interfering remote user may not produce a sufficiently accurate signature estimate for effective null deepening in the direction of the interfering remote user. This is because the estimate may suffer from contamination by the signal of the remote user to which delivered power is maximized. In the preferred embodiment, the method used includes joint signature estimation using the reference signals of both the remote user and any interferer(s). Geometric methods based, for example, on angle of arrival, may alternatively be used to estimate signatures which then are used for null deepening according to any of the signature-based null deepening embodiments described herein.

Another effect that limits null depth is the accuracy to which signatures or covariance matrices are estimated, which in turn is limited by the number of samples, the SNR of the remote user whose signature is to be estimated, and the power of other remote co-channel users. An additional aspect of the present invention is improving the signature estimate by combining data gathered over several bursts with reference signals of multiple remote users computed over the same bursts. This aspect of the invention is motivated by the recognition that the signature estimate of the interfering remote user must be accurate to a degree. To improve the null depth of a least-squares solution over a single burst, for example, the signature estimate typically may need be based on estimates derived from several bursts.

Null Deepening

Using the invention can deepen null towards one remote user or more than one users based on knowledge of the signatures of the one or more users. The signatures may be known or estimated, and one aspect of the invention is a method for estimating the signatures applicable to null deepening. For best performance, the signature estimate should be substantially free of contamination from signals to which beams are directed. The invention uses the signature (known or estimated) of one or more known interferers to modify a known strategy or known strategy determining method to produce a modified strategy with improved null deepening. The knowledge of the signatures may be, for example, from historical signature records.

For the description below, the desired remote user is denoted $SU_i$, and the weight vector for communicating with $SU_i$ is denoted by $w_i$. When communicating with $SU_i$, all other users, denoted $SU_j$ where j is not i, are interferers, and the signature for such interferers are denoted $a_j$, where j is not i.

The Signal Injection Method

Figure 6:
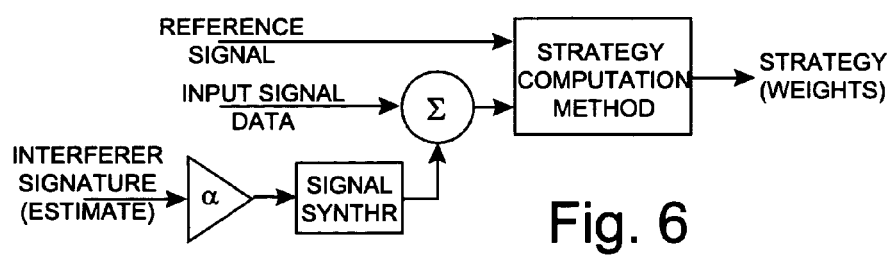
FIG. 6 is a block diagram illustrating some of the signal processing operations applied to received data when implementing an embodiment of the inventive method using the strategy computation of FIG. 3.

A first embodiment of the invention applicable to one null-deepening based on the known or estimated signature of one interferer denoted $SU_j$ with signature (estimate) $a_j$ is shown in FIG. 6. A signal formed from the estimated or known interferer signal is scaled and added to the received signal data Z before determining the strategy, that is, modified received signals described by $$\hat{Z} = Z + \alpha_j \hat{a}_j s_{synth},$$

with $\alpha_j$ a tunable scale factor for any interferer j. $s_{synth}$ is any signal that has the same temporal structure as a typical communication waveform used in the system, or preferably, a temporal structure that would be identified by the particular strategy computation method as not that of the user. For example, for a constant modulus property restoral method, using a non-constant modulus structure for $s_{synth}$ ensures that the strategy computation method recognizes this as an interferer. In the preferred embodiment, however, $s_{synth}$ comprises N random noise samples. In another embodiment, this is a constant signal, that is, the signal [1 1 . . . 1]. The scale factor $\alpha_j$ for any interferer j can be set to a large fixed value to force a deep accurate null towards that undesired subscriber unit signature. The modified input signal $\hat{Z}$ is then applied to any strategy determining scheme, including the ones shown in FIG. 3 and FIG. 5.

Figure 7:
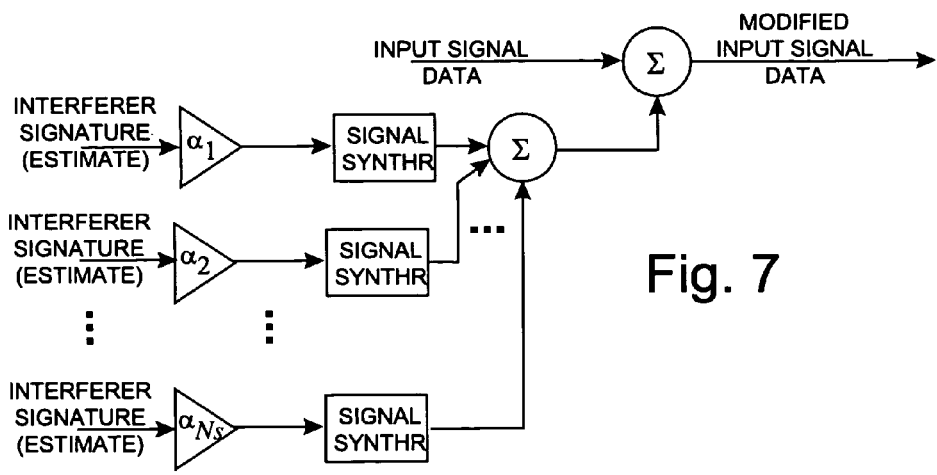
FIG. 7 is a block diagram illustrating some of the signal processing operations applied to received data when implementing an embodiment of the inventive method for deepening more than one null.

A generalization of this embodiment, called "signal injection" herein is illustrated in FIG. 7. Here, nulls are directed to several interferers denoted $SU_j$ where j is not i. Signals are formed from the estimated (or known) signatures of the undesired subscriber units, then are scaled and added to received signal data Z before determining the strategy, that is, modified received signals described by $$\hat{Z} = Z + \sum_{j \neq i} \alpha_j \hat{a}_j s_{synth\_j}, \qquad (8)$$

with $\alpha_j$ a tunable scale factor for any interferer j, are used in place of Z and applied to the strategy determining method, say that of FIG. 3 or that of FIG. 5. for processing SU1 signals. The scale factor $\alpha_j$ for any interferer j can be set to a large fixed value to force a deep accurate null towards each undesired subscriber unit signature. Each of the $s_{synth\_j}$ is any signal that has the same temporal structure as a typical communication waveform used in the system and that would be recognized a non signal of interest, and $s_{synth\_j}$ for any interferer j must be non-collinear with any $s_{synth\_j}$ for any other interferer j'. Again, in the preferred embodiment, each $s_{synth\_j}$ is a set of random samples, with the sets for two distinct interferers being statistically independent.

An improved embodiment makes $\alpha_j$ a function of the relative power levels transmitted to $SU_i$ and jth subscriber units, or to any similar measure derived from received signal strengths, thus forming deep nulls in a controlled way only where needed. That is, the nulls are strong where strong nulls are needed and weak where such strong nulls are not needed. Thus forming weak nulls where allowable would reserve degrees of freedom for use elsewhere, for example to null additional noise sources.

The parameter setting method is described in more detail later in this document.

Figure 8:
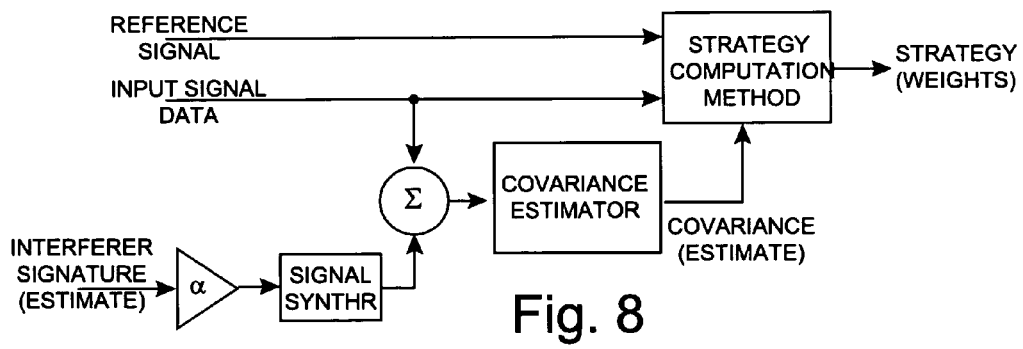
FIG. 8 is a block diagram illustrating some of the signal processing operations applied to received data when implementing an embodiment of the inventive method using the strategy computation of FIG. 5 with the characteristic feature being the covariance.
Figure 9:
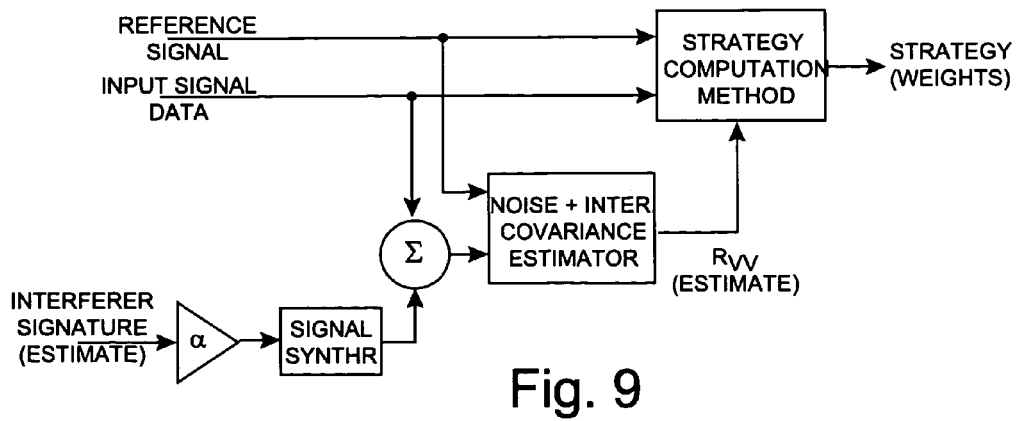
FIG. 9 is a block diagram illustrating some of the signal processing operations applied to received data when implementing yet another embodiment of the inventive method using a noise-plus-interference covariance estimator.

FIG. 8 shows an embodiment of the signal injection method for the case of null-deepening for one interferer for a covariance based strategy determining method. FIG. 9 shows an embodiment of the signal injection method for the case of null-deepening for one interferer for an interference-plus-noise covariance based strategy determining method.

Figure 10:
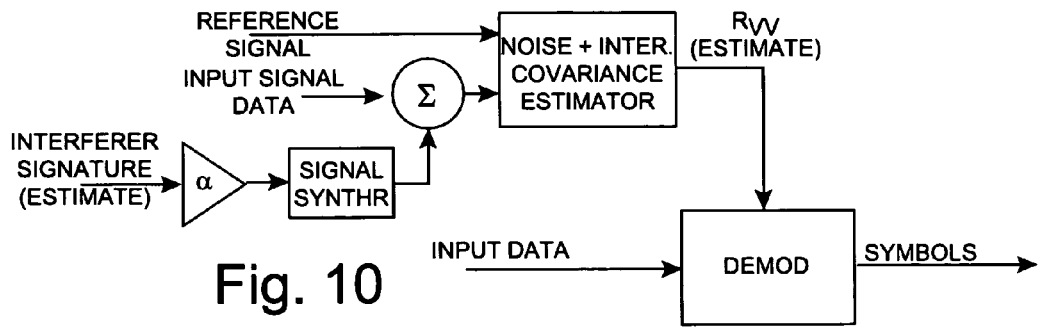
FIG. 10 is a block diagram showing the signal injection based embodiment of the inventive method applied to a non-linear processing strategy.

FIG. 10 is a block diagram showing an embodiment of the inventive method applied to a non-linear strategy generator, where the strategy generator includes a demodulation stage. This may be a Viterbi-algorithm-based decoder which operates based on branch metrics, for example. The invention is shown supplying a modified noise-plus-interference covariance to a demodulator, with the modification based on the signal injection method. The resulting strategy is then applied to some new input data. The demodulator, in this case, may be a Viterbi-algorithm based demodulator in which covariance information is used to "whiten" (i.e., decorrelate) the input data, in this case the new input data. In an alternative, the reference data might also be used to estimate the channel, and provided in the form needed for the Viterbi-method in the demodulator.

Figure 11:
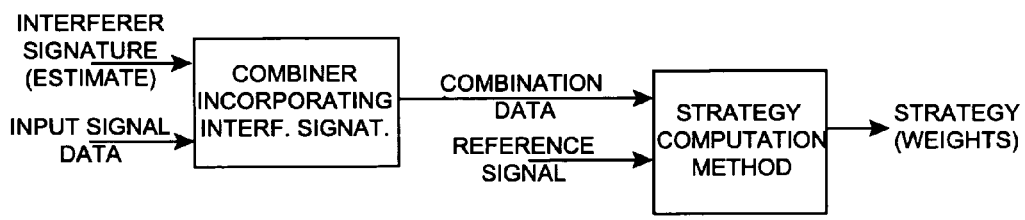
FIG. 11 is a block diagram showing generalized combining method with the signal injection embodiment of the inventive method applied to a processing strategy.

Note that while the signal injection methods preferably involve adding a fraction of the "synthetic" signal generated from the one or more known or estimated interferer signatures, other, non-additive, methods of combining also are within the scope of the present invention. This is shown in FIG. 11. For example, one method for combining includes performing a matrix factorization of the input data and the synthetic data into factors, and then combining the resulting factors to form a combined signal. The factorization may be a generalized singular value decomposition.

Figure 12:
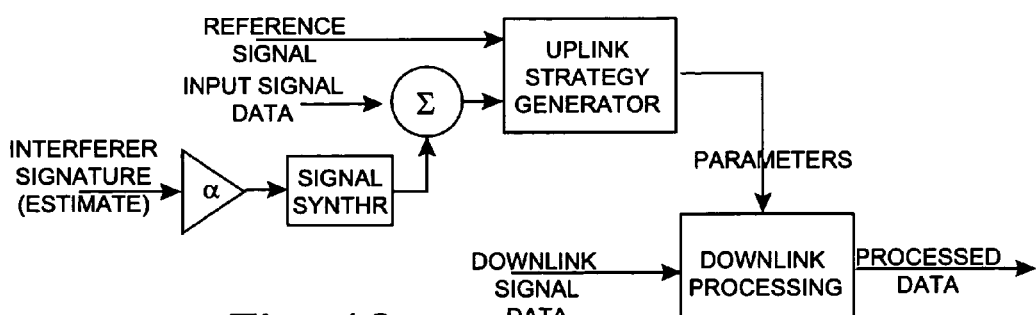
FIG. 12 is a block diagram showing using a signal injection embodiment of the inventive method applied to a processing strategy generator to generate parameters that are then used to process downlink data.

FIG. 12 is a block diagram showing a general application of the inventive method as used to process data in the downlink data. As shown in FIG. 12, an uplink strategy generator (e.g., a weight determining method) is based on a reference signal (obtained from the primary data) and a set of data. In accordance with the present invention, the data input to the strategy generator is a combination of the input data and a signal generated from one or more known or estimated interferer signatures. The output of the strategy generator is a set of parameters which is used in the processing of the downlink data. In the linear spatial processing case, the parameters may be a set of weights. Note that the parameters produced by the strategy generator may be combined with calibration data to produce the required downlink strategy parameters for processing of downlink data.

Strategy Orthogonalization Method

According to this implementation, for the ith remote user, a strategy (e.g., a weight vector $\hat{w}_i$) is determined that is orthogonal to the to estimated (or known) interferer signature(s) $a_j$. Moreover, the strategy is determined from the strategy (e.g., a weight vector $w_i$) for the desired user $SU_i$ and the strategy (e.g., a weight vector $w_j$) used to communicate with the interferer j. The strategies for the user and interferer, respectively, for example weight vectors $w_i$ and $w_j$, respectively, may be obtained using some known strategy determining method, for example that of FIG. 3 or FIG. 5 (including using Eq. (7A) or Eq. (7B)).

In the linear strategy case, assume a linear strategy $w_i$ (spatial or spatio-temporal) exists for receiving from or transmitting to a desired remote user, say the ith, and another linear strategy $w_j$ for receiving from or transmitting to an interferer, say the jth user, where j≠i, where $w_i$ and $w_j$ have substantially the same null and gain patterns, except of course that $w_i$ nulls the interferer and $w_j$ nulls the desired remote user i because when communicating with the interferer, the remote user is an interferer. According to this embodiment of the invention, the improved strategy is $$\hat{w}_i = w_i + \alpha_j w_j, \quad (9)$$

where the scalar tunable factor $\alpha_j$ is chosen to make $\hat{w}_i$ orthogonal to the interferer signature $a_j$. That is, $\alpha_j$ is chosen so that $a_j^H \hat{w}_i = 0$. This is obtained with $$\alpha_j = -\frac{a_j^H w_i}{a_j^H w_j}.$$

A generalization when one has a number of interferers to which nulls are to be deepened is, given a strategy $w_i$ to a desired user i, and several weight vectors $w_j$, j≠i, for interferers, then the strategy (i.e., weight vector) to use is $$\hat{w}_i = w_i + \sum_{j \neq i} \alpha_j w_j,$$

where the $\alpha_j$ are chosen to ensure that the modified strategy $\hat{w}_i$ is orthogonal to the interferer signatures $a_j$, j≠i.

Another particular orthogonalization implementation that modifies the strategy $w_i$ to be orthogonal to all known interferer signatures is, $$\hat{w}_i = w_i - \sum_{j \neq i} \gamma_j \hat{a}_j,$$

where factor $\gamma_j$ is chosen to make $\hat{w}_i$ orthogonal to all the interferer signatures $a_j$, j≠i. The factors $\gamma_j$ may be computed using Gram-Schmidt orthogonalization, which in the case of a single interferer j leads to $$\gamma_j = \frac{w_i^H \hat{a}_j}{\|\hat{a}_j\|^2}.$$

A disadvantage of the this forced signature orthogonalization method, however, is that it may disturb nulls which were formed towards "coherent" noise sources (e.g., from neighboring cells in a cellular system) or towards other incoherent interferers, and may have an effect on the "main lobe" towards the desired SU. Therefore, the preferred strategy orthogonalization method is that of Eq. (9) or its extension to multiple interferers.

Covariance Modification

A third embodiment is applicable to strategy determining methods that use an estimate of the spatial or spatio-temporal covariance (including the interference-plus-noise covariance) determined from the input signal (and possible a reference signal) to determine the strategy. The methods of Eqs. (7A) and (7B) so use the covariance to determine a weight vector. One embodiment of the invention adds some information from the interferer signatures to data used by the covariance estimator of the known weight determining method. For example, if the known weight computation method of Eq. (7B) is used, according to this embodiment of the invention, the weights to use are determined as:

$$\hat{w} = \left( ZZ^H + \gamma I + \sum_{j \neq i} \alpha_j a_j a_j^H \right)^{-1} Z s_i^H, \quad (10)$$

where Z is the received data, and $\alpha_j$ again a tunable scale factor for any interferer j, set as described above for the signal injection method.

Many modifications are possible within the scope of the invention. In general, any uplink (i.e., receive) processing method which takes as input a spatial covariance matrix $R_{zz} = ZZ^H$ computed from input data Z can be modified by altering the spatial covariance matrix $R_{zz}$ to incorporate the effects of the interferers towards which the nulls are desired to be deepened, the modification being:

$$\tilde{R}_{zz} = \left( ZZ^H + \sum_{j \neq i} \alpha_j a_j a_j^H \right). \quad (11)$$

Note that in the preferred embodiment, the weight determining method to which the invention is applied takes as input a spatial covariance matrix $R_{zz}$ and a reference signal cross correlation $r_{zs} = Zs_i^H$.

Figure 13:
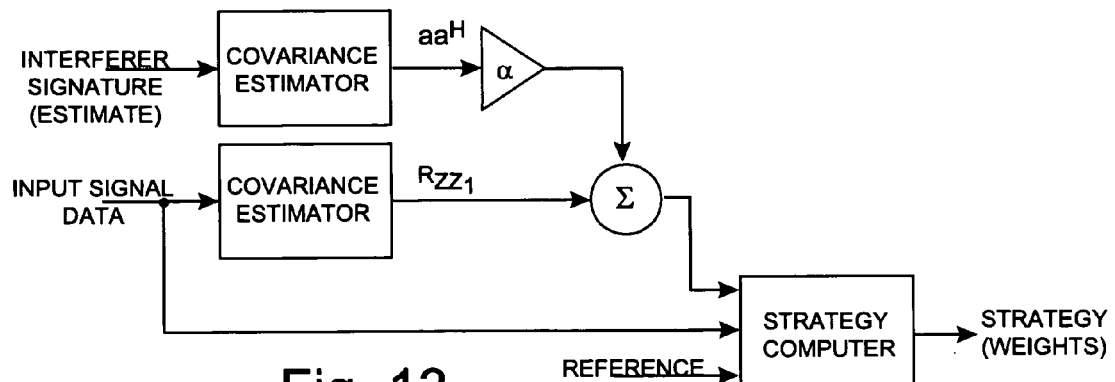
FIG. 13 is a block diagram showing a covariance modification embodiment of the of the inventive method applied to a covariance based processing strategy generator which uses a reference signal, primary data, and a covariance estimator.

FIG. 13 shows one version of this embodiment. The weight strategy computation method is one that uses covariances to determine spatial (or spatio-temporal) weights. These weights might be uplink weights, or may be downlink weights. The known scheme is modified using an aspect of the present invention to determine weights that include interference mitigation based on signature data on known interferers. The computation required includes estimating the known interferer spatial signatures when such spatial signature estimates are unavailable, and also estimating the covariance of those signature estimates and adding a tunable fraction of these interferer covariances to the covariance estimate determined from the received data.

Figure 14:
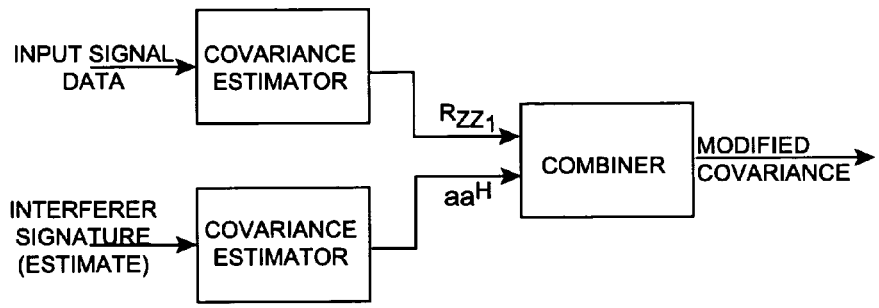
FIG. 14 is a block diagram showing an alternate embodiment of the combining of the input signal covariance estimate and interferer signature covariance estimate.

Other covariance matrix modifications also are possible within the scope of the invention. In yet another alternative shown in FIG. 14, rather than the combining of the interferer data being by adding part of the interferer covariance matrix to the input signal covariance matrix, other methods of combining could be used. For example, the method for combining may includes performing a matrix factorization of the input data and of the signatures into factors, and then combining the resulting factors by one of several methods to form a combined covariance matrix.

Figure 15:
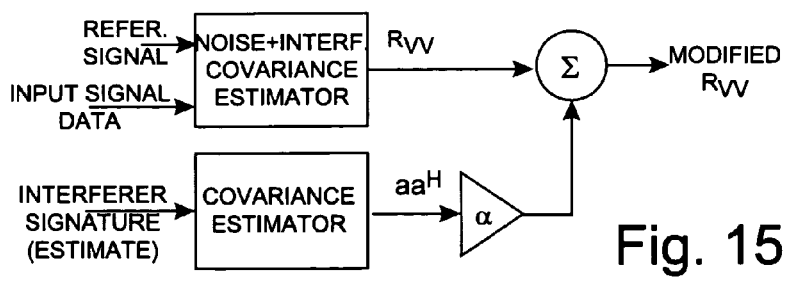
FIG. 15 is a block diagram showing a covariance modification embodiment of the of the inventive method applied to a covariance based processing strategy generator which uses a reference signal, primary data, and a noise-plus-interference covariance estimator.

This embodiment can also be applied to processing methods that use the noise-plus-interference covariance matrix, denoted $R_{vv}$, rather than the noise-plus-interference-plus-signal covariance matrix $R_{zz}$. Such methods include some noise plus interference covariance estimator which uses the received data (containing the signal plus interference plus noise) and the reference signal for the desired user to determine $R_{vv}$. An embodiment of the invention used in such a method is shown in FIG. 15, which shows one embodiment of the method of the invention applied to such $R_{vv}$-based techniques, with $R_{vv}$ substituted for $R_{zz}$. That is, for $R_{vv}$ obtained from the signal data, a modification $$\tilde{R}_{zz} = \left( R_{vv} + \sum_{j \neq i} \alpha_j a_j a_j^H \right). \quad (12)$$

is made, where again the parameters $\alpha_j$ are tunable, and preferable determined from power control as described hereinbelow.

Setting the Tunable Parameters

Many strategies for selecting the parameters $\alpha_j$ are possible within the scope of the invention, and some possible strategies are now described.

Strategy 1 (Applied, for Example, to Signal Injection)

Recalling that according to the signal injection embodiment, after obtaining precise signature estimates $\hat{a}_j$ (or knowing the signatures) of the interferers, given a strategy computation method for determining the strategy for user i from the received signal Z (and possible a reference signal for user i), from the received signal Z is modified to $$\hat{Z} = Z + \Sigma_{j \neq i} \alpha_j \hat{a}_j s_{synth\_j}$$

where $s_{synth\_j}$ is an artificially synthesized signal for the jth interferer. According to a first parameter determining strategy, the parameter $\alpha_j$ is a large constant chosen to be sufficiently large to ensure that the carrier to interference ratio (CIR) in the modified received signal $\hat{Z}$ is small. In this case, the base station is forced to place a deep null towards the jth subscriber unit, where $j \neq i$, for a strategy to the ith user. The carrier to interference ratio is easily estimated as the ratio of what is indicated by the received signal strength indicator (RSSI) typically available at a receiver to the interferer power, which is being controlled by a large value of the parameter.

It is interesting to note that for an interference mitigating strategy computation method that uses a reference signal for interference mitigating, such as those of Eq. (7A) and (7B), in the limit when $\alpha_j \to \infty$, the transmit weight for the ith user is orthogonal to $\hat{a}_j$.

For the covariance modification method, note that the covariance of an input signal includes terms from each of the constituent signals in the input received signal Z. A practical covariance estimate may include cross terms, so approximately includes terms from each of the constituent signals in the input received. The covariance modification changes the interference constituents reflected in the covariance estimate. According to this strategy 1 when applied to the covariance modification method, the adjustable parameter for any interferer is selected to be a number sufficiently large to ensure that the carrier to interference ratio reflected by the modified covariance estimate is small.

Strategy 2 (Applied, for Example, to Signal Injection)

This strategy uses some knowledge of the transmitted power towards or from each subscriber unit. On the downlink, this information is usually readily available in a typical base station in the downlink power control unit. According to this parameter tuning strategy, the parameters $\alpha_j$ are chosen in such a way that the power distribution of the constituent signals in $\hat{Z}$ is inversely proportional to the distribution of the downlink power that the base station transmits towards the subscriber units.

In order to find exact formulas for $\alpha_j$, one notes that the received signal Z may be modeled as $$Z = a_i s_i + \Sigma_{j \neq i} a_j s_j + v, \quad (13)$$

where v is (non-co-channel) interference plus noise, $a_i$ and $s_i$ are the signature of and transmitted signal from the remote user of interest, and the $a_j$ and $s_j$ are the signatures of and transmitted signals, respectively, of the interferers, where $j \neq i$. Recalling that according to the signal injection embodiment, after obtaining precise signature estimates $\hat{a}_j$ (or knowing the signatures) of the interferers, the received signal Z is modified to $$\hat{Z} = Z + \Sigma_{j \neq i} \alpha_j \hat{a}_j s_{synth\_j}$$

where $s_{synth\_j}$ is an artificially synthesized signal for the jth interferer. Combining the model of Eq. (13) with the signal injection to give the following equation for the modified received signal:

$$\hat{Z} = a_i s_i + \Sigma_{j \neq i} (a_j s_j + \alpha_j \hat{a}_j s_{synth\_j}) + n.$$

Assuming that the signals $s_j$ and $s_{synth\_j}$ are uncorrelated, the average powers of the constituent signals in $\hat{Z}$ due to the desired user i and the jth interferer, j≠i, are given by $\|a_i\|^2 \sigma_i^2$ and $\{\|a_j\|^2 \sigma_j^2 + |\alpha_j|^2 \|\hat{a}_j\|^2 \sigma^2_{synth\_j}\}$, respectively, where $\sigma_j^2$ denotes the average power of signal $s_j$ and $\sigma^2_{synth\_j}$ denotes the average power of the synthesized signal. Note that the constituent due to the jth interferer is a function of tunable parameter $\alpha_j$.

Denote by $P_j$ the power of the downlink signal that the base station transmits towards the jth remote user. The design objective of strategy can be expressed as follows: maintain the same ratio of interferer power to remote user signal power reflected in the constituent parts of the modified covariance as the ratio of respective interferer power to remote user transmit power used to transmit to the respective interferer and the remote user, respectively.

Strategy 3 (Applied, for Example, to Covariance Modification)

In addition to the tunable parameter setting method described above using the signal injection method as an illustrative example, another feature of the invention is determining exactly the parameter setting for an amount of null depth required in null deepening when using the any of the inventive null deepening methods.

For sake of simplicity of notation, we'll consider the case where there are two dominant co-channel users (e.g., two spatial channels), users i and j. The method can be easily extended to more users. The covariance modification method and the strategy orthogonalization method will be considered as examples.

In the linear strategy case, assume a modified linear strategy $\hat{w}_i$ (spatial or spatio-temporal) exists for receiving from or transmitting to a desired remote user, say the ith, with an interferer j and using parameter $\alpha_j$ to obtain the "null deepened" strategy $\hat{w}_i$. Similarly, assume that another modified linear strategy $\hat{w}_j$ exists for receiving from or transmitting to an interferer, say the jth user, where j≠i, the modification using parameter $\alpha_j$, with $\hat{w}_i$ and $\hat{w}_j$ have substantially the same null and gain patterns, except of course that $w_i$ nulls the interferer and $w_j$ nulls the desired remote user i because when communicating with the interferer, the remote user is an interferer.

According to this third strategy, applicable to the case of the strategy applied in the downlink, the parameters $\alpha_i$ and $\alpha_j$ are chosen to minimize total transmit power, subject to the constraints that the signal quality experienced by each co-channel user (e.g., i and j) in the set including the particular remote user of interest and at least one of the one or more interferers present, meets or exceeds some prescribed quality of service. Several measures of signal quality may be used, and the signal-to-interference-plus-noise ratio (SINR) is preferably used. Using the model of Eq. (13) that Choose the tunable parameters $\alpha_j$ so that the ratio of the average powers of the remote user i and each co-channel interferer j is the same as the ratio of the powers used to transmit to the interferer j and the remote user i. By using the approximation $\|a_j\| \approx \|\hat{a}_j\|$, $$|\alpha_j|^2 \frac{1}{\sigma^2_{synth\_j}} \left( \frac{P_i \|\hat{a}_i\|^2}{P_j \|\hat{a}_j\|^2} \sigma_i^2 - \sigma_j^2 \right).$$

By adding the constraint that $\alpha_j$ must be a positive real number, it follows that, when $P_i \|\hat{a}_i\|^2 \sigma_i^2 > P_j \|\hat{a}_j\|^2 \sigma_j^2$, $$\alpha_j = \frac{1}{\sigma_{synth\_j}} \sqrt{\frac{P_i \|\hat{a}_i\|^2}{P_j \|\hat{a}_j\|^2} \sigma_i^2 - \sigma_j^2}.$$

When $P_i \|\hat{a}_i\|^2 \sigma_i^2 \leq P_j \|\hat{a}_j\|^2 \sigma_j^2$, then there is no need for null deepening, and therefore a value of zero is used for $\alpha_j$.

In many systems, the remote user signals have approximately the same average power ($\sigma_i = \sigma_j = \sigma_{synth}$), so that a simplified power based strategy sets the tunable parameters $\alpha_j$ as a functions of the ratio of the power used to transmit to the remote user to the power for transmission to the remote user, and the ratio of the square of the vector norms of the remote user and the interferer. Mathematically, when $P_i \|\hat{a}_i\|^2 > P_j \|\hat{a}_j\|^2$, $$\alpha_j = \sqrt{\frac{P_i \|\hat{a}_i\|^2}{P_j \|\hat{a}_j\|^2} - 1}.$$

Again, when $P_i \|\hat{a}_i\|^2 \leq P_j \|\hat{a}_j\|^2$, there is no need for null deepening, which is equivalent to a value of zero being used for $\alpha_j$.

Note that when applied to the covariance modification method, according to this strategy 2, the adjustable parameter for any interferer is selected to approximately $$Z = a_i s_i + a_j s_j + v,$$

where v is the interference (other than user j) and noise, and assuming a modified linear strategy $\hat{w}_i$ and $\hat{w}_j$ for remote users i and j, respectively, estimates of the SINR of the two co-channel users are $$SINR_i = \frac{|\hat{w}_i^H a_i|^2}{|\hat{w}_i^H a_i|^2 + \sigma_i^2} \text{ and } SINR_j = \frac{|\hat{w}_j^H a_j|^2}{|\hat{w}_j^H a_j|^2 + \sigma_j^2}.$$

Therefore, determining the parameters $\alpha_i$ and $\alpha_j$ that minimize the total transmit power subject to the SINR being above some threshold $SINR_{thresh}$ is solving $$\arg \min_{\{\alpha_i, \alpha_j\}} \{\|\hat{w}_i\|^2 + \|\hat{w}_j\|^2\}$$

subject to $$SINR_i \geq SINR_{thresh} \text{ and } SINR_j \geq SINR_{thresh},$$

where $\hat{w}_i$ and $\hat{w}_j$ are the strategies for user i and j respectively after applying null deepening with parameters $\alpha_i$ and $\alpha_j$ using any of the inventive null deepening method embodiments.

As an example, consider the covariance modification embodiment described by Eq. (11) applied to the weight computation method described by Eq. (7A). To determine the parameter $\alpha_i$, we first apply the well known matrix inversion lemma to the combination of Eq. (7A) and Eq. (11) to obtain an expression for $w_i$ in terms of the quantities $R_{zz}^{-1}$, $r_{zsi} = Zs_i^H$, $\alpha_i$, $\alpha_j$, $a_i$, and $a_j$. In particular, $$\hat{w}_i R_{zz}^{-1} r_{zsi} - \frac{\alpha_j^2 R_{zz}^{-1} a_j a_j^H R_{zz}^{-1} r_{zsj}}{1 + \alpha_j^2 a_j R_{zz}^{-1} a_j^H}.$$

Note that except for $\alpha_i$, and $\alpha_j$, all of the quantities in this expression and in the constraint expressions for $SINR_i$ and $SINR_j$ can either be readily estimated ($\sigma_i^2$, $\sigma_j^2 a_i$, and $a_j$.) or else are already computed ($R_{zz}^{-1}$, $r_{zsi}$, and $r_{zsj}$). Hence, the $SINR_i$ and $SINR_j$ constraint equations can be written as $$\sum_{l=0}^{2} \sum_{m=0}^{2} {}^i c_{l,m} (\alpha_i^2)^l (\alpha_j^2)^m \geq 0 \quad (14A)$$

where the constants ${}^i c_{l,m}$ are defined in terms of $\sigma_i^2$, $\sigma_j^2 a_i$, $a_j$, $R_{zz}^{-1}$, $r_{zsi}$, $r_{zsj}$, and $SINR_{thresh}$.

Similarly, the total power cost function $P = \{\|\tilde{w}_i\|^2 + \|\tilde{w}_j\|^2\}$ can be expressed as $$P = \frac{d_{i,1}(\alpha_i^2)^2 + d_{i,2}\alpha_j^2 + d_{i,3}}{d_{i,4}(\alpha_i^2)^2 + d_{i,5}\alpha_i^2 + 1} + \frac{d_j(\alpha_j^2)^2 + d_{j,2}\alpha_j^2 + d_{j,3}}{d_{j,4}(\alpha_j^2)^2 + d_{j,5}\alpha_j^2 + 1} \quad (14B)$$

Eqs. (14A) and (14B) constitute a constrained nonlinear optimization problem in $\alpha_i^2$ and $\alpha_j^2$, and can be solved numerically using any of many known nonlinear constrained optimization techniques, as would be clear to one of ordinary skill in the art. In practice, one interferer tends to dominate among co-channel users, namely the user farthest away. Applying null-deepening to this dominant interferer alone accrues most of the gains. In this case, the optimization problem is considerably simplified, since there is then only a single variable, $\alpha_j^2$ over which the solution needs to be optimized. The constraints are then quadratic in a $\alpha_j^2$.

Note the above description of parameter setting methods is not meant to be limiting. It would be clear to those in the art that many other alternate parameter setting strategies are possible for the invention.

Improved Signature Estimation

The interferer signatures to use in any of the above embodiments may be known signatures, for example, from known records. If the signatures are not known, the signatures maybe estimated using any method, including those now described.

Consider two subscriber units, denoted $SU_i$ and $SU_j$, respectively. When communicating with $SU_i$, for example, $SU_j$ is an interferer. The null deepening methods described above all require known or estimated signatures of the known interferers. An improved method for estimating signatures applicable to null deepening is now described.

When the received signals are sampled, say with N samples, the base station computes the weight for the ith remote user. Many methods are possible for the weight computation, including by the methods described by Eqs. (7A) and (7B). That is, the weight to use for the ith remote may be determined by $$w_i = \mathrm{argmin}_w \|w^H Z - s_i\|^2 = (R_{zz})^{-1} r_{zsi} = (ZZ^H)^{-1} Z s_i^H,$$

or in an improved version, by $$w_i = (ZZ^H + \gamma I)^{-1} Z s_i^H,$$

where $s_i$ is an estimate, for example the reference signal for the ith transmitted signal, and $i=1, 2, \ldots, N_s$, the number of co-channel users. Note that the quantity $r_{zsi} = Z s_i^H$ is computed at the base station for each remote user i in order to form weights to determine each of the signal estimates $s_i$. This observation motivates one known method of estimating the signature of the ith remote user, which under the assumption of white noise, gives the maximum-likelihood (MLE) estimate when there is only a single subscriber unit. That estimate is $$\tilde{a}_i = Z s_i^H (s_i s_i^H)^{-1}, \quad (15)$$

where $s_i$ is the reference signal for the ith remote user. The $(s_i s_i^H)^{-1}$ term is a scalar factor used for normalizing the signature.

When other remote users share the same channel, the spatial signature estimate of Eq. (15) is contaminated by cross correlations between signatures. This may be seen by combining the model of Eq. (4) with Eq. (15), to obtain $$Z s_i^H = a_i s_i s_i^H + \sum_{j \neq i} a_j s_j s_i^H + V s_i^H \quad (16)$$

where matrix V is $$V = [v(1) v(2) \ldots v(N)].$$

The second term of Eq. (16) is implicitly assumed to be zero in the prior-art signature estimation method described by Eq. (15), but this assumption is inaccurate for short data sequences as encountered in practical systems, such as in the wireless local loop (WLL) system base station and the mobile PHS base station in which the method of present invention is implemented.

Another method for signature estimation takes these cross-correlation terms into account. Let S is the matrix with the Ns reference signals as the rows. That is, $$S = \begin{bmatrix} s_1 \\ s_2 \\ \vdots \\ s_{Ns} \end{bmatrix}.$$

Let A be a matrix having the Ns signature values as columns. That is, $A = [a_1 \ a_2 \ \ldots \ a_{Ns}]$. Then the MLE solution is $$\hat{A} = \arg \min_A \|Z - AS\|^2 = Z S^H (SS^H)^{-1} \quad (17)$$

where $\hat{A}$ is the matrix having the signatures estimates as columns, $$\hat{A} = [\hat{a}_1 \ \hat{a}_2 \ \ldots \ \hat{a}_{Ns}]. \quad (18)$$

See for example, A. Lee Swindlehurst, S. Daas, J. Yang: "Analysis of a Decision Directed Beamformer, *IEEE Trans. on Sig. Proc.* Vol. 43, No. 12, pp. 29202927, December, 1995.

For Ns=2 remote users, the estimates of Eq. (17) can be expressed as $$\hat{a}_1 = Zs_1^H \|s_2\|^2 - \frac{s_2^H(s_2 s_1^H)}{\|s_1\|^2 \|s_2\|^2 - |s_1 s_2^H|^2} \quad (19)$$

and $$\hat{a}_2 = Zs_2^H \|s_1\|^2 - \frac{s_1^H(s_1 s_2^H)}{\|s_1\|^2 \|s_2\|^2 - |s_1 s_2^H|^2}, \quad (20)$$

respectively.

While the estimator of Eq. (17) gives an accurate signature estimate, it is computationally complex. The third signature estimation method described herein is an iterative method which is computationally simpler than that of Eq. (17) but provides for a more accurate estimate than that of Eq. (15).

The method is first described for the case that the base station is (or is assumed to be) handling two spatial channels (i.e., two remote users communicating with the base station on the same carrier and in the same time slot), or that there is one spatial channel and a known interferer. The signature estimate for the second remote user (the interferer) can then be computed as follows:

Step 1: Compute the an estimate of $a_1$ using any known method, for example, that of Eq. (15):

$$\tilde{a}_1 = Zs_1^H(s_1 s_1^H)^{-1} \quad (21)$$

where $s_1$ is the reference signal for SU1.

Step 2: Subtract from the received signal an estimate of the contribution of the first remote user:

$$\tilde{Z} = Z - \tilde{a}_1 s_1, \quad (22)$$

Step 3: Compute the improved estimate of $\tilde{a}_2$ using the received signal with the first user estimated contribution removed:

$$\hat{a}_2 = \tilde{Z} s_2^H (s_2 s_2^H)^{-1}, \quad (23)$$

where $s_2$ is a reference signal obtained for the second remote user. That is, one needs to have a reference signal for the interferer towards which one is directing the null.

Since the correction term subtracted from Z in Eq. (22) is itself an approximation, iteratively repeating Eqs. (22) and (23) may improve the estimate further. For the case in which Eq. (15) is used in step 1 above, substituting Eqs. (21) and (22) into Eq. (23), one obtains $$\hat{a}_2 = Z\left[I - s_1^H(s_1 s_1^H)^{-1} s_1\right] s_2^H(s_2 s_2^H)^{-1} \quad (24)$$

$$= Z \frac{s_2^H \|s_1\|^2 - s_1^H(s_1 s_2^H)}{\|s_1\|^2 \|s_2\|^2}.$$

Eqs. (24) and (20) differ only by a constant, so the recursive method in this case converges to the MLE solution (within a scale factor) in one iteration.

This recursive method can be extended to incorporate an arbitrary number of remote users. A method for Ns=3 is as follows. To estimate the signature for some additional remote user, denoted SU3, with three remote users Ns=3:

Step 1: Compute $\tilde{a}_2$ using any known method, for example the method of Eq. (21) (applied however to SU2).

Step 2: Form the decorrelated estimate which removes the SU2 contribution $$\tilde{a}_2 = \tilde{Z} s_2^H(s_2 s_2^H)^{-1}, \quad (25)$$

where $\tilde{Z}$ is given in Eq. (22), but applied for SU2.

Step 3: Iterate the estimate of $a_1$ with the value of $\tilde{a}_2$ just found, $$\tilde{a}_1^1 = (Z - \tilde{a}_2 s_2) s_1^H (s_1 s_1^H)^{-1}. \quad (26)$$

Step 4: Compute the estimate of the desired SU3 signature, $$\hat{a}_3 = (Z - \tilde{a}_1^1 s_1 - \tilde{a}_2 s_2) s_3^H (s_3 s_3^H)^{-1}, \quad (27)$$

where $s_3$ is a reference signal for the user SU3.

Estimation of signatures for two remote users, SU1 and SU2, with Ns=3 results from appropriately changing the indices in this procedure.

A generalization of the iterative method is as follows for the general case of Ns signatures to be estimated:

Step 1: Assume some initial estimates. For example, assume the starting values are those given by Eq. (15), i.e., $\tilde{a}_i = Zs_i^H(s_i s_i^H)^{-1}$ for i=1, . . . Ns.

Step 2: Obtain an estimate for each signature, while keeping the values of the remaining Ns−1 signatures to be the most recently determined estimate values, each of these fixed most recently determined estimate values initially being the initial value from step 1, and later being either the values determined when this Step 2 was previously applies to another signature in the same iteration, or, for those signatures for which no estimate has yet been obtained during the current iteration, the estimate from the most recent previous iteration. Denoting the jth user's estimate by $\hat{a}_j$, this jth signature estimate is obtained as the solution to $$\hat{a}_j = \arg\min_{a_j} \|Z - AS\|^2,$$

while the other Ns−1 values are so fixed, where again $A = [a_1 \, a_2 \, \ldots \, a_{Ns}]$.

Repeat this procedure for all j=1, 2, . . . , Ns, replacing the value at which any signature estimate is fixed to be the most recently obtained estimate value.

Step 3: Repeat Step 2 iteratively until convergence is reached.

To further improve signature estimation, in another aspect of this invention, each desired signature estimate $\hat{a}_j$ is singular value decomposition-averaged (SVD-averaged) over successive signal streams (i.e., bursts) to reduce the contribution of the noise-related error term in Eq. (15). One method of performing SVD averaging comprises stacking up the signatures to be combined as the columns of a matrix, then performing the SVD of the resulting matrix. The SVD averaged value is then taken as the left singular vector corresponding to the largest principal value. An alternate SVD-averaging embodiment uses a weighted moving window (last few signatures) SVD average which favors recent data. Other combining methods also may be used.

To see how having a better signature estimate improves the null deepening, consider the case of two users, user $SU_i$ and user $SU_j$, with $SU_i$ being the desired user and $SU_j$ the interferer, and let $$\hat{a}_j = a_j + \mu a_i + \epsilon$$

be the estimate of the interference signature $a_j$, where $\epsilon$ is the estimation error orthogonal to $a_i$, the signature of user $SU_i$, and ($\mu a_i$) is the estimation error in the direction of $a_i$.

The null deepening methods described herein direct a null in the direction of $\hat{a}_j$ and a gain in the direction of $a_i$. Thus, if we want a good null in the direction of $a_j$, we must have both μ very small, and a good null in the direction of ε (even if ε is comparatively large). One case for which the term μ may be undesirably large occurs when the desired remote user signal is present in the received data and when the signature $a_j$ is estimated using Eq. (15), i.e., using cross-correlation with the reference signal $s_j$. A smaller value of μ allows a deep null to be directed in the direction of $a_i$. The term μ can be greatly reduced by estimating the interferer signature $\hat{a}_j$ using Eq. (17) for joint maximum likelihood estimation on the reference signals corresponding to both the remote user and the interferer, or by using the iterative method. In each case, a deep null may then be directed in the direction of $\hat{a}_j$.

Results of Simulations

To see how having a better signature estimate improves the null deepening, consider the case of two users, user $SU_i$ and user $SU_j$, with $SU_i$ being the desired user and $SU_j$ the interferer, and let $$\hat{a}_j = a_j + e$$

be the estimate of the interference signature $a_j$, where e is the estimation error.

Assume also that for the purpose of this performance analysis, the received signal may be modeled as $$Z = a_i s_i + a_j s_j + v,$$

where v represents temporally white noise and interference.

For the signature estimation method described in Eq. (15) and for the improved method described in Eq. (17), the signature error covariance $E[e \, e^H]$ is, up to a constant of proportionality, approximately equal to $E[v \, v^H] + \mu a_i a_i^H$, where for the method of Eq. (15), μ is proportional to the SNR of $SU_i$ and for the method of Eq. (17), μ is nearly zero.

In one embodiment of the invention, a weight $\tilde{w}_i$ is computed that is close to the MMSE weight $w_i$ such that $\tilde{w}_i$ is nearly orthogonal to $\hat{a}_j$. Thus, $$0 = \tilde{w}_i^H \hat{a}_j = \tilde{w}_i^H \tilde{w}_i a_j + \tilde{w}_i^H e.$$

If we choose to measure null depth by the expected squared dot product $$ND = E[|\tilde{w}_i^H a_j|^2],$$

then the null depth approaches zero (the depth of a perfect null) if $$E[|\tilde{w}_i^H e|^2] = E[\tilde{w}_i^H E[e \, e^H] \tilde{w}_i] = E[\tilde{w}_i^H E[v \, v^H] \tilde{w}_i] + \mu E[\tilde{w}_i^H a_i a_i^H \tilde{w}_i]$$

also approaches zero. The term $E[\tilde{w}_i^H E[v \, v^H] \tilde{w}_i]$ in the right hand side of the above equation tends to be small for any interference-mitigating weight $\tilde{w}_i$ (e.g., for a weight determined using a reference signal of the desired user signal, such as the methods of Eq. (7A) or Eq. (7B)). The $\mu E[\tilde{w}_i^H a_i a_i^H \tilde{w}_i]$ term, however, is small only if μ is small, because the weight $\tilde{w}_i$ delivers power towards the signature $a_i$ of the desired user $SU_i$. Thus the method of Eq. (17) for signature estimation—which has μ close to zero—will often yield improved null depth compared to the method of Eq. (15).

Simulations were used to evaluate the performance of several embodiments of the present invention.

The uplink signal was formed by adding three equal-power simulated subscriber unit signals, each consisting of 50 symbol-spaced samples of a randomly generated π/4 DQPSK baseband waveform. The simulation used a 12-element antenna array for both transmission and reception. Uplink spatial signatures were drawn randomly and uniformly from the complex 12-sphere; uplink and downlink signatures were assumed equal. Additive white Gaussian noise was added to the uplink signal to set the received SNR equal to 12 dB, where SNR is measured at the output of an ideal interference-free linear beamformer.

Performance was computed by Monte-Carlo averaging over 1000 independent runs.

Signature estimation was performed using both the single-user maximum-likelihood method of Eq. (15) and the two-user maximum-likelihood method of Eq. (17). Signatures were averaged using SVD averaging over Navgs=1, 2, 4, 8, and 16 bursts. The accuracy of signature estimation was evaluated using the dot product $$c = \frac{|\hat{a}_j^H a_j|}{\|\hat{a}_j\| \|a_j\|}.$$

Three nulling strategies were computed: the baseline MMSE strategy of Eq. (7A), a null-deepened strategy computed using signal injection method with $\alpha_j=1000$, and a null deepening strategy using weight orthogonalization. Null depth was measured by the expected dot product $$ND = \frac{|\hat{w}_j^H a_j|}{\|\hat{w}_j\| \|a_j\|}.$$

The simulated received data used to compute the signature estimate was reused to compute the null-deepened strategy.

The null depth $ND_{MMSE}$ of the baseline prior-art MMSE method was compared to the null depths $ND_{sig\_inj}$ and $ND_{sig\_inj}$ of the inventive signal injection and inventive orthogonalization methods, respectively, using the quantities $$dB_{sig\_inj} = 20 \log_{10}(ND_{MMSE}/ND_{sig\_inj}),$$

and $$dB_{orthog} = 20 \log_{10}(ND_{MMSE}/ND_{orthog}),$$

respectively. Median results over 1000 runs are tabulated below.

| Navgs | c (eq 15) | c (eq 17) | $dB_{sig\_inj}$ | $dB_{orthog}$ |
| --- | --- | --- | --- | --- |
| 1 | 0.9792 | 0.9869 | 0.86 dB | 0.78 dB |
| 2 | 0.9896 | 0.9930 | 3.80 dB | 3.94 dB |
| 4 | 0.9942 | 0.9965 | 6.76 dB | 6.75 dB |
| 8 | 0.9971 | 0.9984 | 9.94 dB | 9.93 dB |
| 16 | 0.9987 | 0.9992 | 12.5 dB | 12.6 dB |

Figure 16:
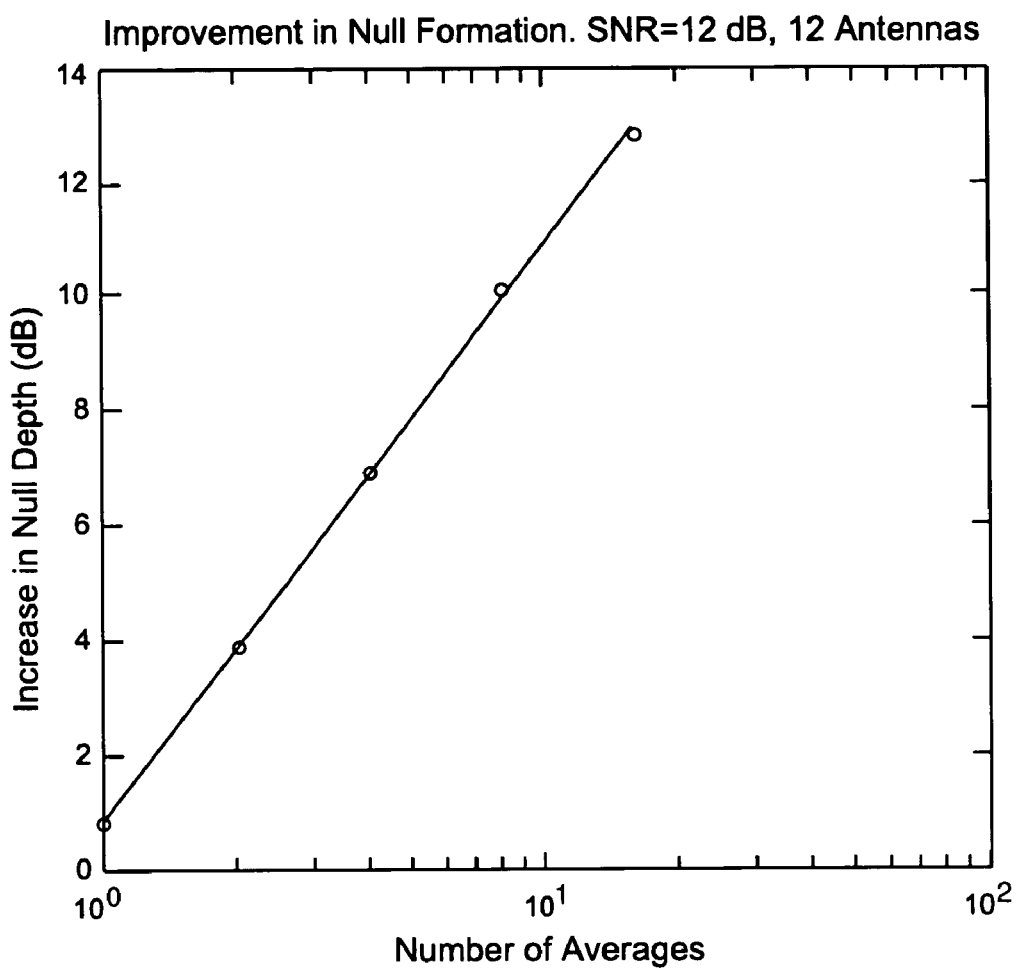
FIG. 16 is a plot of the performance obtained by using aspects of the invention in a simulated environment.

As can be seen from the table, the results were almost identical for the two embodiments of the invention. Also, as can be seen from the table and from FIG. 16, doubling the number of bursts over which the signature estimate is averaged increases the null depth improvement by roughly 3 dB.

The simulations also confirmed that the depth of the null directed towards the second interferer (i.e., the interferer towards which no deepening was performed and no signature estimation carried out) was not significantly affected by the signal injection method or orthogonalization embodiments of the inventive method.

OTHER EMBODIMENTS

In another embodiment, an explicit signature estimate is not needed, and instead the uplink weights for two co-spatial remote users are combined to construct weights with improved nulling performance, while again substantially preserving the rest of the null and gain pattern.

Note that the apparatus and method of the present invention does not need to explicitly identify any new interferer waveforms. Note also that the various embodiments of the invention can be used for smart antenna processing on the downlink, or for smart antenna processing on the uplink. That is, the embodiments can be used on the downlink for smart antenna processing signals that are received at the antenna elements of an antenna array which is part of a wireless receiver, or on the uplink for smart antenna processing a signal to be transmitted to form signals for transmission by the antenna elements of an antenna array which is part of a wireless transmitter. In general, the term "wireless station" therefore may be used for: (i) a receiver having an array of antenna elements; (ii) a transmitter having an array of antenna elements; or (iii) a transceiver having an array of antenna elements for both reception and transmission.

Several aspects of the invention described herein were described implemented as programs run on one or more DSP devices. Given sufficient economic incentive, DSP functionality, including DSP programs, may be incorporated into special purpose hardware, for example as part of an application specific integrated circuit (ASIC) or as part of a very large scale integrated circuit (VLSI). DSP functionality may also be met by other processors, for example a general purpose microprocessor. In addition, a DSP device running a program may be converted into a special purpose piece of hardware. Thus, the terms processor, digital signal processor, DSP, and DSP device as used herein include these equivalent alternatives.

The terms and expressions which have been used herein are used as terms of description and not of limitation, and there is no intention in the use of such terms and expressions of excluding equivalents of the features shown and described, or portions thereof, it being recognized that various modifications are possible within the scope of the invention claimed.

What is claimed is:

1. A method comprising:
    computing an antenna processing strategy to define a transmitted signal or to process a received signal for a remote user, based at least in part on received signal data;
    determining signature data of one or more interferers; and
    modifying the antenna processing strategy to realize an improved null toward at least one interferer by incorporating the determined signature data of the one or more interferers with the received signal data to reduce one or both of antenna transmit signal strength in, and sensitivity of the antenna to signals from, one or more interferers.

2. The method of claim 1 wherein incorporating signature data relating to one or more interferers comprises:
    combining the received signal data and the signature data; and
    computing a modified processing strategy based, at least in part, on the combination.

3. The method of claim 2 wherein combining the received signal data and the signature data further comprises modifying one or more characteristic features of the received signal data with an estimate of the one or more characteristic features in the signature data.

4. The method of claim 3 wherein the estimate includes a selectable parameter.

5. The method of claim 4 wherein the parameter selected is sufficiently large to cause a carrier to interference ratio (CIR) corresponding to the modified characteristic feature to be small.

6. The method of claim 4 wherein the parameter for a co-channel interferer is selected to cause a ratio on downlink of interferer transmit power to remote user transmit power to approximate a ratio of the modified feature estimate of interferer power to remote user power.

7. The method of claim 4 wherein the estimate of the one or more characteristic features of the received signal data comprises an estimate of the covariance of the received signal data.

8. The method of claim 7 wherein the covariance estimate comprises a noise-plus-interference-plus-signal covariance estimate.

9. The method of claim 7 wherein the covariance estimate comprises a noise-plus-interference covariance estimate.

10. The method of claim 7 wherein combining the received signal data and the signature data comprises:
    computing a covariance estimate of the received signal data;
    computing a covariance estimate of the interferer signature data for each interferer; and
    summing the covariance estimate of the received signal data, and the covariance estimate of the interferer signature data scaled by a selectable parameter.

11. The method of claim 7 wherein combining the received signal data and the signature data comprises:
    performing a matrix factorization of the received signal data;
    performing a matrix factorization of the interferer signature data for each interferer;
    scaling the factors of the matrix factorization of the interferer signature data by a selectable parameter; and
    combining the scaled factors and the factors of the matrix factorization of the received signal data.

12. The method of claim 3 wherein combining the received signal data and the signature data further comprises:
    determining supplementary signal data from each interferer signature;
    scaling the supplementary signal data by a selectable parameter; and
    combining the received signal data and the scaled supplementary signal data.

13. The method of claim 12 wherein the parameter selected is sufficiently large to cause a carrier to interference ratio (CIR) corresponding to the modified characteristic feature to be small.

14. The method of claim 12 wherein the parameter for a co-channel interferer is selected to cause a ratio on downlink of interferer transmit power to remote user transmit power to approximate a ratio of the modified feature estimate of interferer power to remote user power.

15. The method of claim 12 wherein the supplementary signal data includes random samples generated from the interferer signature data.

16. The method of claim 12 wherein combining the received signal data and the scaled supplementary signal data comprises:
performing a matrix factorization of the received data and the signature data; and
combining the resulting factors.

17. The method of claim 1 wherein the signature data comprises a known signature for the one or more interferers.

18. The method of claim 1 wherein modifying the antenna processing strategy by incorporating signature data further comprises:
estimating the signature of one or more of the interferers; and
modifying the antenna processing strategy by incorporating the estimate as the interferer signature data.

19. The method of claim 18 wherein estimating the signature comprises determining a high likelihood estimate of an interferer signature, the determination based on the assumption that no remote user signal and no other interferer signals are present.

20. The method of claim 18 wherein estimating the signature comprises determining a high likelihood estimate of an interferer signature, the determination based on the assumption that the remote user signal and all other known interferer signals are present.

21. The method of claim 18 wherein estimating the signature further comprises:
initializing a value for each signature to be estimated; and
iteratively repeating, until a computation to estimate a value for the signature does not alter the value by more than a predetermined amount, for each signature to be estimated:
computing an estimate value for a particular signature while holding the value of the other signatures at their values as initialized; and
using the estimate value as the value for the particular signature in successive computations.

22. The method of claim 1 wherein computing and modifying an antenna processing strategy comprises generating and modifying a set of weights to apply during processing for the remote user.

23. The method of claim 22 wherein the interferers comprise remote users, each having a corresponding weight for communicating with a wireless station, and wherein modifying the set of weights further comprises:
scaling the corresponding weights of each interferer by a selectable parameter; and
adding the scaled weights to the set of weights of the remote user for which the antenna processing strategy is being computed.

24. The method of claim 23 wherein the parameter is selected to force the modified set of weights to be substantially orthogonal to the interferer signature.

25. An apparatus comprising:
a processor to compute an antenna processing strategy to define a transmitted signal or to process a received signal for a remote user, the computation based at least in part on received signal data; and
circuitry coupled with the processor, the circuitry to determine signature data of one or more interferers and to incorporate the signature data with the received signal data to modify the processing strategy to realize an improved null toward at least one interferer by reducing one or both of antenna transmit signal strength in, and sensitivity of the antenna to signals from, one or more interferers.

26. The apparatus of claim 25 wherein the circuitry to incorporate signature data relating to each interferer further comprises a combiner coupled with the processor to provide a combination of the received signal data and the signature data, the processor to compute a modified antenna processing strategy based, at least in part, on the combination.

27. The apparatus of claim 26 wherein to provide a combination of the received signal data and the signature data further comprises the circuitry to modify one or more characteristic features of the received signal data with an estimate of the one or more characteristic features in the signature data.

28. The apparatus of claim 27 wherein the estimate includes a selectable parameter.

29. The apparatus of claim 28 wherein the parameter selected is sufficiently large to cause a carrier to interference ratio (CIR) corresponding to the modified characteristic feature to be small.

30. The apparatus of claim 26 wherein the signature data comprises a known signature for the one or more interferers.

31. The apparatus of claim 28 wherein the parameter for a co-channel interferer is selected to cause a ratio on downlink of interferer transmit power to remote user transmit power to approximate a ratio of the modified feature estimate of interferer power to remote user power.

32. The apparatus of claim 28 wherein the one or more characteristic features of the received signal data comprises an estimate of the covariance of the received signal data.

33. The apparatus of claim 32 wherein the covariance estimate comprises a noise-plus-interference-plus-signal covariance estimate.

34. The apparatus of claim 32 wherein the covariance estimate comprises a noise-plus-interference covariance estimate.

35. The apparatus of claim 32 wherein to provide a combination of the received signal data and the signature data comprises the combiner to:
compute a covariance estimate of the received signal data;
compute a covariance estimate of the interferer signature data for each interferer; and
sum the covariance estimate of the received signal data, and the covariance estimate of the interferer signature data scaled by a selectable parameter.

36. The apparatus of claim 32 wherein to provide a combination of the received signal data and the signature data comprises the circuitry to:
perform a matrix factorization of the received signal data;
perform a matrix factorization of the interferer signature data for each interferer;
scale the factors of the matrix factorization of the interferer signature data by a selectable parameter; and
combine the scaled factors and the factors of the matrix factorization of the received signal data.

37. The apparatus of claim 27 wherein to provide a combination of the received signal data and the signature data further comprises the combiner to combine the received signal data and supplementary signal data determined from each interferer signature, the supplementary data scaled by a selectable parameter.

38. The apparatus of claim 37 wherein the parameter selected is sufficiently large to cause a carrier to interference ratio (CIR) corresponding to the modified characteristic feature to be small.

39. The apparatus of claim 37 wherein the parameter for a co-channel interferer is selected to cause a ratio on downlink of interferer transmit power to remote user transmit power to approximate a ratio of the modified feature estimate of interferer power to remote user power.

40. The apparatus of claim 37 wherein the supplementary signal data includes random samples generated from the interferer signature data.

41. The apparatus of claim 37 wherein to provide a combination of the received signal data and the scaled supplementary signal data comprises the combiner to:
   perform a matrix factorization of the received data and the signature data; and
   combine the resulting factors.

42. The apparatus of claim 26 wherein to incorporate interferer signature data further comprises:
   a signature estimator circuit coupled with the circuitry to estimate the signature of one or more of the interferers; and
   the processor to modify the antenna processing strategy by incorporating the estimate as the interferer signature data.

43. The apparatus of claim 42 wherein to estimate the signature comprises the estimator to determine a high likelihood estimate of an interferer signature, the determination based on the assumption that no remote user signal and no other interferer signals are present.

44. The apparatus of claim 42 wherein to estimate the signature comprises the estimator to determine a high likelihood estimate of an interferer signature, the determination based on the assumption that the remote user signal and all other known interferer signals are present.

45. The apparatus of claim 42 wherein to estimate the signature further comprises the estimator to:
   initialize a value for each signature to be estimated; and
   iteratively repeat, until a computation to estimate a value for the signature does not alter the value by more than a predetermined amount, for each signature to be estimated:
   compute an estimate value for a particular signature while holding the value of the other signatures at their values as initialized; and
   use the estimate value as the value for the particular signature in successive computations.

46. The apparatus of claim 26 wherein to compute an antenna processing strategy comprises the processor to generate a set of weights to apply during processing for the remote user, and wherein to modify the processing strategy comprises the circuitry to adjust the set of weights.

47. The apparatus of claim 46 wherein the interferers comprise remote users, each having a corresponding weight for communicating with a wireless station, and wherein to adjust the set of weights further comprises the circuitry to:
   scale the corresponding weights of each interferer by a selectable parameter; and
   add the scaled weights to the set of weights of the remote user for which the antenna processing strategy is to be computed.

48. The apparatus of claim 47 wherein the parameter is selected to force the modified set of weights to be substantially orthogonal to the interferer signature.

49. An article comprising a machine-accessible medium to provide content to cause one or more electronic systems to:
   compute an antenna processing strategy to define a transmitted signal or to process a received signal for a remote user, based at least in part on received signal data;
   determine signature data of one or more interferers; and
   modify the antenna processing strategy to realize an improved null toward at least one interferer by incorporating the determined signature data of the one or more interferers with the received signal data to reduce one or both of antenna transmit signal strength in, and sensitivity of the antenna to signals from, one or more interferers.

50. The article of claim 49 wherein incorporating signature data relating to each of one or more interferers comprises the one or more electronic systems to:
   combine the received signal data and the signature data; and
   compute a modified processing strategy based, at least in part, on the combination.

51. The article of claim 50 wherein to combine the received signal data and the signature data further comprises the one or more electronic systems to:
   perform a matrix factorization of the received data and supplementary signal data determined for each interferer signature; and
   combine the resulting factors of the received data, with the resulting factors of the supplementary signal data scaled by a selectable parameter.

52. The article of claim 50 wherein to combine the received signal data and the signature data further comprises the one or more electronic systems to modify one or more characteristic features of the received signal data with an estimate of the one or more characteristic features in the signature data.

53. The article of claim 52 wherein the estimate includes a selectable parameter.

54. The article of claim 53 wherein to combine the received signal data and the signature data comprises the one or more electronic systems to:
   compute a covariance estimate of the received signal data;
   compute a covariance estimate of the interferer signature data for each interferer; and
   sum the covariance estimate of the received signal data, and the covariance estimate of the interferer signature data scaled by a selectable parameter.

55. The article of claim 53 wherein to combine the received signal data and the signature data comprises the one or more electronic systems to:
   perform a matrix factorization of the received signal data;
   perform a matrix factorization of the interferer signature data for each interferer;
   scale the factors of the matrix factorization of the interferer signature data by a selectable parameter; and
   combine the scaled factors and the factors of the matrix factorization of the received signal data.

56. The article of claim 49 wherein to modify the antenna processing strategy by incorporating signature data further comprises the one or more electronic systems to:
   estimate the signature of one or more of the interferers; and
   modify the antenna processing strategy by incorporating the estimate as the interferer signature data.

57. The article of claim 56 wherein to estimate the signature further comprises the one or more electronic systems to:
   initialize a value for each signature to be estimated; and
   iteratively repeat, until a computation to estimate a value for the signature does not alter the value by more than a predetermined amount, for each signature to be estimated:

compute an estimate value for a particular signature while holding the value of the other signatures at their values as initialized; and use the estimate value as the initial value for the particular signature in successive computations.

58. The article of claim 49 wherein to compute and to modify an antenna processing strategy comprises the one or more electronic systems to generate and to adjust a set of weights to apply during processing for the remote user.

59. The article of claim 58 wherein the interferers comprise remote users, each having a corresponding weight for communicating with a wireless station, and wherein to adjust the set of weights further comprises the one or more electronic systems to:

scale the corresponding weights of each interferer by a selectable parameter; and add the scaled weights to the set of weights of the remote user for which the antenna processing strategy is to be computed.

60. The method of claim 1 performed by a wireless receiver to modify the antenna processing strategy to realize the improved null on uplink or downlink.

61. The method of claim 1 performed by a subscriber device.

62. The apparatus of claim 25 implemented in a wireless receiver that is to modify the antenna processing strategy to realize the improved null on uplink or downlink.

63. The apparatus of claim 25 implemented in a subscriber device.

64. A subscriber device comprising:

a processor of the subscriber device to compute an antenna processing strategy to process a received signal for a wireless device, the computation based at least in part on received signal data; and circuitry of the subscriber device coupled with the processor, the circuitry to determine signature data of one or more interferers and to incorporate the signature data with the received signal data to modify the antenna processing strategy to realize an improved null toward at least one interferer by reducing one or both of antenna transmit signal strength in, and sensitivity of the antenna to signals from, one or more interferers.

65. The subscriber device of claim 64 wherein the signature data comprises a known signature for the one or more interferers.

66. The subscriber device of claim 64 further comprising a signature estimator circuit coupled with the circuitry to estimate the signature of one or more of the interferers.

67. A subscriber device comprising:

a processor of the subscriber device to compute an antenna processing strategy to define a transmitted signal for a wireless device, the computation based at least in part on received signal data; and circuitry of the subscriber device coupled with the processor, the circuitry to determine signature data of one or more interferers and to incorporate the signature data with the received signal data to modify the antenna processing strategy to realize an improved null toward at least one interferer by reducing one or both of antenna transmit signal strength in, and sensitivity of the antenna to signals from, one or more interferers.

68. The subscriber device of claim 67 wherein the signature data comprises a known signature for the one or more interferers.

69. The subscriber device of claim 67 further comprising a signature estimator circuit coupled with the circuitry to estimate the signature of one or more of the interferers.

70. A wireless receiver comprising:

one or more antennas to receive a signal having an improved null towards one or more interferers, the improved null generated by a wireless transmitter determining signature data of one or more interferers, incorporating the determined signature data with received signal data, and modifying an antenna processing strategy to realize the improved null toward the one or more interferers by reducing antenna transmit signal strength in the one or more interferers; and receive electronics coupled with the one or more antennas to process the received signal.

* * * * *